(12) United States Patent
Tajima et al.

(10) Patent No.: US 8,822,088 B2
(45) Date of Patent: *Sep. 2, 2014

(54) POWER STORAGE DEVICE

(75) Inventors: Ryota Tajima, Kanagawa (JP); Shunpei Yamazaki, Tokyo (JP); Teppei Oguni, Kanagawa (JP); Takeshi Osada, Kanagawa (JP); Shinya Sasagawa, Kanagawa (JP); Kazutaka Kuriki, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/610,951

(22) Filed: Sep. 12, 2012

(65) Prior Publication Data

US 2013/0071762 A1  Mar. 21, 2013

(30) Foreign Application Priority Data

Sep. 16, 2011 (JP) ................. 2011-203579
Sep. 22, 2011 (JP) ................. 2011-207692
Sep. 30, 2011 (JP) ................. 2011-217646

(51) Int. Cl.
| | | |
|---|---|---|
| H01M 4/36 | (2006.01) | |
| H01M 10/0525 | (2010.01) | |
| H01M 4/62 | (2006.01) | |
| B82Y 30/00 | (2011.01) | |
| H01M 4/1395 | (2010.01) | |
| H01M 4/38 | (2006.01) | |
| H01M 4/134 | (2010.01) | |
| H01M 10/46 | (2006.01) | |

(52) U.S. Cl.
CPC ............. *B82Y 30/00* (2013.01); *H01M 10/465* (2013.01); *H01M 10/0525* (2013.01); *Y02E 60/122* (2013.01); *H01M 4/625* (2013.01); *H01M 4/366* (2013.01); *H01M 4/1395* (2013.01); *H01M 4/386* (2013.01); *H01M 4/134* (2013.01)
USPC ................ 429/405; 429/231.8; 429/218.1; 429/245; 429/238

(58) Field of Classification Search
USPC ............... 429/231.8, 218.1, 245, 238
See application file for complete search history.

(56) References Cited

U.S. PATENT DOCUMENTS

| | | |
|---|---|---|
| 7,179,561 B2 | 2/2007 | Niu et al. |
| 7,745,047 B2 | 6/2010 | Zhamu et al. |

(Continued)

FOREIGN PATENT DOCUMENTS

| | | |
|---|---|---|
| CN | 101346837 A | 1/2009 |
| CN | 101373846 A | 2/2009 |

(Continued)

OTHER PUBLICATIONS

International Search Report (Application No. PCT/JP2012/073560; PCT15818/15845115881) Dated Dec. 18, 2012.

(Continued)

*Primary Examiner* — Nicholas P D'Aniello
*Assistant Examiner* — Jimmy K Vo
(74) *Attorney, Agent, or Firm* — Nixon Peabody LLP; Jeffrey L. Costellia

(57) ABSTRACT

A power storage device which has high charge/discharge capacity and less deterioration in battery characteristics due to charge/discharge and can perform charge/discharge at high speed is provided. A power storage device includes a negative electrode. The negative electrode includes a current collector and an active material layer provided over the current collector. The active material layer includes a plurality of protrusions protruding from the current collector and a graphene provided over the plurality of protrusions. Axes of the plurality of protrusions are oriented in the same direction. A common portion may be provided between the current collector and the plurality of protrusions.

24 Claims, 24 Drawing Sheets

(56) References Cited

U.S. PATENT DOCUMENTS

| | | | |
|---|---|---|---|
| 7,842,432 B2 | 11/2010 | Niu et al. | |
| 7,939,218 B2 | 5/2011 | Niu | |
| 7,977,007 B2 | 7/2011 | Niu et al. | |
| 7,977,013 B2 | 7/2011 | Niu et al. | |
| 8,206,569 B2 | 6/2012 | Lopatin et al. | |
| 8,278,011 B2 | 10/2012 | Zhu et al. | |
| 8,334,073 B2 | 12/2012 | Sato et al. | |
| 2004/0191609 A1 | 9/2004 | Tamura et al. | |
| 2008/0254296 A1 | 10/2008 | Handa et al. | |
| 2009/0104515 A1 | 4/2009 | Fujikawa et al. | |
| 2010/0143798 A1 | 6/2010 | Zhamu et al. | |
| 2010/0151329 A1 | 6/2010 | Sato et al. | |
| 2010/0176337 A1 | 7/2010 | Zhamu et al. | |
| 2010/0203391 A1 | 8/2010 | Lopatin et al. | |
| 2010/0209784 A1 | 8/2010 | Yamazaki et al. | |
| 2010/0216026 A1 | 8/2010 | Lopatin et al. | |
| 2010/0227228 A1 | 9/2010 | Yamazaki et al. | |
| 2010/0248074 A1 | 9/2010 | Oki et al. | |
| 2010/0330421 A1 | 12/2010 | Cui et al. | |
| 2011/0012067 A1 | 1/2011 | Kay | |
| 2011/0020706 A1 | 1/2011 | Nesper | |
| 2011/0075322 A1 | 3/2011 | Kuriki et al. | |
| 2011/0111303 A1 | 5/2011 | Kung et al. | |
| 2011/0121240 A1 | 5/2011 | Amine et al. | |
| 2011/0159372 A1 | 6/2011 | Zhamu et al. | |
| 2011/0165466 A1* | 7/2011 | Zhamu et al. | 429/231.8 |
| 2011/0229795 A1 | 9/2011 | Niu et al. | |
| 2012/0070738 A1 | 3/2012 | Yoshida | |
| 2012/0237823 A1 | 9/2012 | Lopatin et al. | |

FOREIGN PATENT DOCUMENTS

| | | |
|---|---|---|
| CN | 102379050 A | 3/2012 |
| CN | 102667985 A | 9/2012 |
| JP | 2001-093513 | 4/2001 |
| JP | 2001-283834 | 10/2001 |
| JP | 2004-296096 | 10/2004 |
| JP | 2006-265751 | 10/2006 |
| JP | 2008-117758 | 5/2008 |
| JP | 2009-104892 | 5/2009 |
| JP | 2009-524567 | 7/2009 |
| JP | 2009-176721 | 8/2009 |
| JP | 2010-219030 | 9/2010 |
| JP | 2010-219392 | 9/2010 |
| JP | 2010-239122 | 10/2010 |
| JP | 2011-503804 | 1/2011 |
| JP | 2011-029184 | 2/2011 |
| JP | 2011-097031 | 5/2011 |
| JP | 2011-517053 | 5/2011 |
| JP | 2012-087043 | 5/2012 |
| JP | 2012-518891 | 8/2012 |
| KR | 2008-0053920 A | 6/2008 |
| KR | 2011-0122177 A | 11/2011 |
| KR | 2012-0030970 A | 3/2012 |
| KR | 2012-0058470 A | 6/2012 |
| TW | 201034276 A1 | 9/2010 |
| WO | WO-2006/062947 A2 | 6/2006 |
| WO | WO-2007/061945 A2 | 5/2007 |
| WO | WO-2008/044461 A1 | 4/2008 |
| WO | WO-2009/061685 A1 | 5/2009 |
| WO | WO-2009/127901 A1 | 10/2009 |
| WO | WO-2009/144600 A2 | 12/2009 |
| WO | WO-2010/090956 A2 | 8/2010 |
| WO | WO-2010/091352 A2 | 8/2010 |
| WO | WO-2010/098977 A2 | 9/2010 |
| WO | WO-2011/040345 A1 | 4/2011 |

OTHER PUBLICATIONS

Written Opinion (Application No. PCT/JP2012/073560; PCT15818/15845/15881) Dated Dec. 18, 2012.

Zhou.X et al., "Graphene modified LiFePO4 cathode materials for high power lithium ion batteries ,", J. Mater. Chem. (Journal of Materials Chemistry), 2011, vol. 21, pp. 3353-3358.

Su.F et al., "Flexible and planar graphene conductive additives for lithium-ion batteries,", J. Mater. Chem. (Journal of Materials Chemistry), 2010, vol. 20, pp. 9644-9650.

Yu.G et al., "Solution-Processed Graphene/MnO2 Nanostructured Textiles for High-Performance Electrochemical Capacitors,", Nano Letters, 2011, vol. 11, No. 7, pp. 2905-2911.

\* cited by examiner

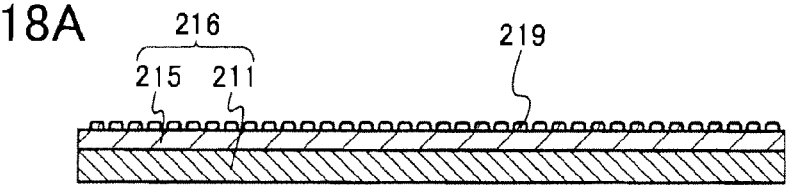
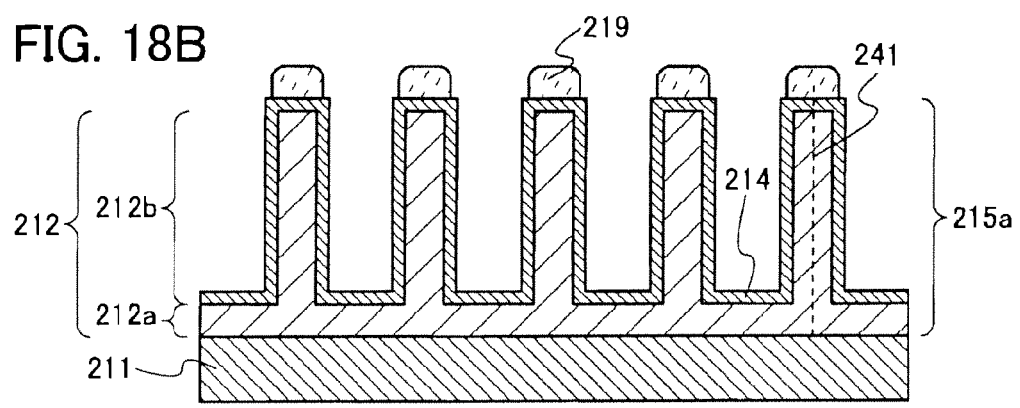
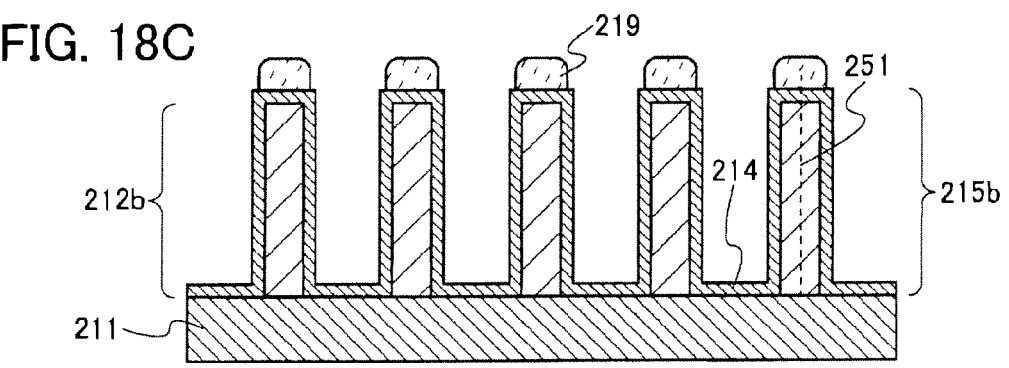
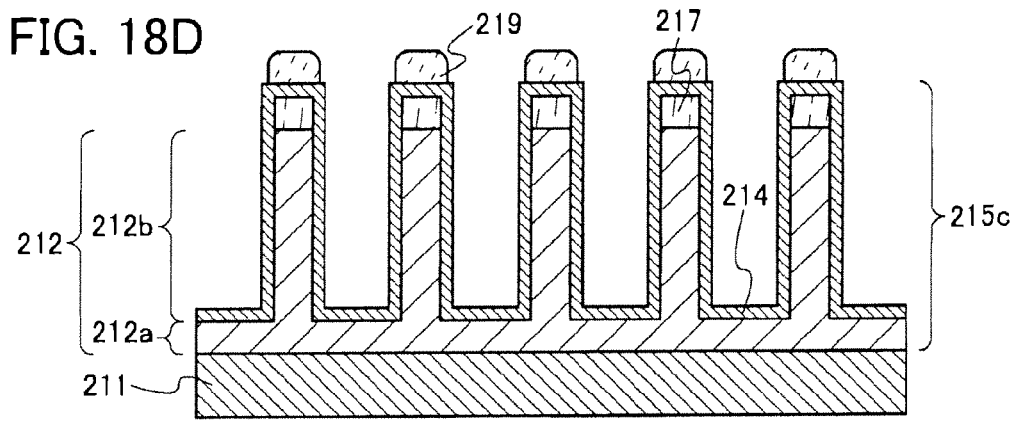

US 8,822,088 B2

POWER STORAGE DEVICE

TECHNICAL FIELD

The present invention relates to a power storage device and a method for manufacturing the power storage device.

BACKGROUND ART

In recent years, power storage devices such as lithium-ion secondary batteries, lithium-ion capacitors, and air cells have been developed.

An electrode for the power storage device is manufactured by providing an active material over a surface of a current collector. As a negative electrode active material, a material which can occlude and release ions functioning as carriers (hereinafter referred to as carrier ions), such as carbon or silicon, is used. For example, silicon or phosphorus-doped silicon can occlude about four times as many carrier ions as carbon and thus has higher theoretical capacity than carbon and is advantageous in increasing the capacity of the power storage device.

However, when the amount of carrier ions which are occluded is increased, the volume of an active material greatly changes in accordance with occlusion and release of carrier ions in charge/discharge cycle, resulting in lower adhesion between a current collector and silicon and deterioration in battery characteristics due to charge/discharge. Accordingly, a layer formed using silicon is formed over a current collector and a layer formed using a graphite is formed over the layer formed using silicon, thereby reducing deterioration in battery characteristics due to expansion and contraction of the layer formed using silicon (see Patent Document 1).

Silicon has lower electric conductivity than carbon; thus, by covering surfaces of silicon particles with a graphite and forming an active material layer including the silicon particles over a current collector, a negative electrode in which the resistivity of the active material layer is reduced is manufactured.

In recent years, the use of a graphene as a conductive electronic material in semiconductor devices has been studied. A graphene refers to a sheet of carbon molecules with a thickness of one atomic layer having double bonds (also referred to as graphite bonds or $sp^2$ bonds).

A graphene is chemically stable and has favorable electric characteristics and thus has been expected to be applied to channel regions of transistors, vias, wirings, and the like included in the semiconductor devices. In addition, particles of an active material are covered with a graphite or a graphene in order to increase the conductivity of a material for an electrode in a lithium-ion battery (see Patent Document 2).

Further, in a power storage device, a positive electrode and a negative electrode are each provided with a plurality of protrusions so as to increase the capacity; in such a power storage device, a top portion of each of the plurality of protrusions of the positive electrode and the negative electrode is provided with an insulator in order to reduce pressure applied to a separator between the electrodes when the volume of the electrodes increases owing to charge/discharge (see Patent Documents 3 to 5).

REFERENCE

Patent Document

[Patent Document 1] Japanese Published Patent Application No. 2001-283834
[Patent Document 2] Japanese Published Patent Application No. 2011-029184
[Patent Document 3] Japanese Published Patent Application No. 2010-219030
[Patent Document 4] Japanese Published Patent Application No. 2010-239122
[Patent Document 5] Japanese Published Patent Application No. 2010-219392

DISCLOSURE OF INVENTION

When a layer formed using silicon provided over a current collector is covered with a layer formed using a graphite, since the thickness of the layer formed using a graphite is large, e.g., submicron to micron, the amount of carrier ions transferred between an electrolyte and the layer formed using silicon is reduced. In addition, in an active material layer including silicon particles covered with a graphite, the amount of silicon contained in the active material layer is reduced. Consequently, the amount of reaction between silicon and carrier ions is reduced, which causes a reduction in charge/discharge capacity and makes it difficult to perform charge/discharge at high speed in a power storage device.

In addition, even when particles of an active material are covered with a graphene, it is difficult to suppress expansion and contraction of the volume of the particles of the active material owing to repeating charge/discharge and to suppress pulverization of the particles of the active material due to the expansion and the contraction.

In view of the above, an embodiment of the present invention provides a power storage device in which charge capacity and discharge capacity are high, charge/discharge can be performed at high speed, and deterioration in battery characteristics due to charge/discharge is small.

An embodiment of the present invention is a power storage device including a negative electrode. The negative electrode includes a common portion, a plurality of protrusions protruding from the common portion, and a graphene provided over the common portion and the plurality of protrusions. At least the plurality of protrusions function as an active material. Axes of the plurality of protrusions are oriented in the same direction.

Note that in a lateral cross-sectional shape, an area of a bottom portion of each of the plurality of protrusions which is in contact with the common portion may be larger than an area of a top portion of each of the plurality of protrusions. In addition, in a longitudinal cross-sectional shape, a width of a bottom portion of each of the plurality of protrusions which is in contact with the common portion may be larger than a width of a top portion of each of the plurality of protrusions.

An embodiment of the present invention is a power storage device including a negative electrode. The negative electrode includes a current collector and an active material layer provided over the current collector. The active material layer includes a plurality of protrusions protruding from the current collector, and a graphene provided over the plurality of protrusions. Axes of the plurality of protrusions are oriented in the same direction. Note that a common portion may be provided between the current collector and the plurality of protrusions.

Note that a cross-sectional area of a bottom portion of each of the plurality of protrusions which is in contact with the current collector may be larger than a cross-sectional area of a top portion of each of the plurality of protrusions. In addition, in a longitudinal cross-sectional shape, a width of a bottom portion of each of the plurality of protrusions which is in contact with the current collector may be larger than a width of a top portion of each of the plurality of protrusions.

An embodiment of the present invention is a power storage device including a common portion, a plurality of protrusions protruding from the common portion, and a graphene provided over the common portion and the plurality of protrusions. At least the plurality of protrusions function as an active material. The plurality of protrusions have translation symmetry when viewed from the above.

Note that in a lateral cross-sectional shape, an area of a bottom portion of each of the plurality of protrusions which is in contact with the common portion may be larger than an area of a top portion of each of the plurality of protrusions. In addition, in a longitudinal cross-sectional shape, a width of a bottom portion of each of the plurality of protrusions which is in contact with the common portion may be larger than a width of a top portion of each of the plurality of protrusions.

An embodiment of the present invention is a power storage device including a current collector and an active material layer provided over the current collector. The active material layer includes a plurality of protrusions protruding from the current collector and a graphene provided over the plurality of protrusions. The plurality of protrusions have translation symmetry when viewed from the above. Note that a common portion may be provided between the current collector and the plurality of protrusions.

Note that a cross-sectional area of a bottom portion of each of the plurality of protrusions which is in contact with the current collector may be larger than a cross-sectional area of a top portion of each of the plurality of protrusions. In addition, in a longitudinal cross-sectional shape, a width of a bottom portion of each of the plurality of protrusions which is in contact with the current collector may be larger than a width of a top portion of each of the plurality of protrusions.

In the electrode, the common portion means a region which covers an entire surface of the current collector and is formed using a material similar to that of the plurality of protrusions. Further, an axis of each of the plurality of protrusions means a straight line which passes a top portion of the protrusion (or the center of a top surface of the protrusion) and the center of a bottom surface of the protrusion which is in contact with the common portion or the current collector. That is, the axis is a straight line which passes the center of the longitudinal direction of the protrusion. When the axes of the plurality of protrusions are oriented in the same direction, the straight lines of the plurality of protrusions are substantially parallel with each other. Specifically, the angle between the straight lines of the plurality of protrusions is less than or equal to 10 degrees, preferably less than or equal to 5 degrees. As described above, the plurality of protrusions are structures which are formed by etching and different from whisker-like structures which extend in various directions.

The common portion and the plurality of protrusions may be formed using silicon, silicon to which an impurity imparting a conductivity type such as phosphorus or boron is added, single crystal silicon, polycrystalline silicon, or amorphous silicon. Alternatively, the common portion may be formed using single crystal silicon or polycrystalline silicon, and the plurality of protrusions may be formed using amorphous silicon. Further alternatively, the common portion and part of the plurality of protrusions may be formed using single crystal silicon or polycrystalline silicon, and the other part of the plurality of protrusions may be formed using amorphous silicon.

The plurality of protrusions may each have a columnar shape, a conical or pyramidal shape, a plate-like shape, or a pipe-like shape.

A protective layer may be provided between a top portion of each of the plurality of protrusions and the graphene.

Surfaces of the plurality of protrusions may be covered with a graphene. A graphene includes a single-layer graphene and a multilayer graphene in its category. A graphene may contain oxygen at a concentration of higher than or equal to 2 at. % and lower than or equal to 11 at. %, preferably higher than or equal to 3 at. % and lower than or equal to 10 at. %.

In addition, an insulating layer functioning as a spacer may be provided over the graphene of the negative electrode.

The insulating layer provided over the graphene of the negative electrode has a top surface having a dot-like shape, a rectangular shape, a lattice-like shape, or the like and is provided over a top portion of at least one protrusion. The insulating layer provided over the graphene of the negative electrode is preferably formed using an organic material such as an acrylic resin, an epoxy resin, a silicone resin, polyimide, or polyamide, or low-melting-point glass such as glass paste, glass frit, or glass ribbon. The insulating layer provided over the graphene of the negative electrode may contain electrolyte solute. The thickness of the insulating layer provided over the graphene of the negative electrode is preferably greater than or equal to 1 μm and less than or equal to 10 μm, more preferably greater than or equal to 2 μm and less than or equal to 7 μm.

An embodiment of the present invention is a method for manufacturing an electrode, including the steps of forming a mask over a silicon substrate, etching part of the silicon substrate to form a common portion and a plurality of protrusions protruding from the common portion, and forming a graphene over the common portion and the plurality of protrusions.

An embodiment of the present invention is a method for manufacturing an electrode, including the steps of forming a silicon layer over a current collector, forming a mask over the silicon layer, etching part of the silicon layer to form a plurality of protrusions protruding from the current collector, and forming a graphene at least over the plurality of protrusions.

An embodiment of the present invention is a method for manufacturing a negative electrode, including the steps of forming a mask over a silicon substrate, etching part of the silicon substrate to form a common portion and a plurality of protrusions protruding from the common portion, forming another mask by reducing the mask in size by oxygen plasma treatment or the like, etching at least part of the plurality of protrusions protruding from the common portion to form a common portion and a plurality of protrusions so that in a lateral cross-sectional shape, an area of a bottom portion of each of the plurality of protrusions which is in contact with the common portion is larger than an area of a top portion of each of the plurality of protrusions, and forming a graphene over the common portion and the plurality of protrusions.

An embodiment of the present invention is a method for manufacturing a negative electrode, including the steps of forming a silicon layer over a current collector, forming a mask over the silicon layer, etching part of the silicon layer to form a plurality of protrusions protruding from the current collector, forming another mask by reducing the mask in size by resist slimming or the like, etching at least part of the plurality of protrusions protruding from the current collector to form a plurality of protrusions so that in a lateral cross-sectional shape, an area of a bottom portion of each of the plurality of protrusions which is in contact with the current collector is larger than an area of a top portion of each of the plurality of protrusions, and forming a graphene over the current collector and the plurality of protrusions.

An embodiment of the present invention is a method for manufacturing a negative electrode, including the steps of forming a mask over a silicon substrate, etching part of the silicon substrate to form a common portion and a plurality of protrusions protruding from the common portion, forming a graphene over the common portion and the plurality of protrusions, and forming an insulating layer functioning as a spacer over the graphene.

An embodiment of the present invention is a method for manufacturing a negative electrode, including the steps of forming a silicon layer over a current collector, forming a mask over the silicon layer, etching part of the silicon layer to form a plurality of protrusions protruding from the current collector, forming a graphene at least over the plurality of protrusions, and forming an insulating layer functioning as a spacer over the graphene.

An active material of an electrode includes a common portion and a plurality of protrusions which protrude from the common portion. Axes of the plurality of protrusions are oriented in the same direction and the protrusions protrude in the direction perpendicular to the common portion, so that the density of the protrusions in the electrode can be increased and the surface area of the active material can be increased. A space is provided between the plurality of protrusions. Further, a graphene is provided over the active material. Thus, even when the active material expands in charging, contact between the protrusions can be reduced. Even when the active material is separated, the active material can be prevented from being broken. The plurality of protrusions have translation symmetry and formed with high uniformity in the negative electrode, so that local reaction can be reduced in each of the positive electrode and the negative electrode, and carrier ions and the active material react with each other uniformly between the positive electrode and the negative electrode. Consequently, in the case where the negative electrode is used for a power storage device, high-speed charge/discharge becomes possible, and breakdown and separation of the active material due to charge/discharge can be suppressed, that is, a power storage device with improved charge/discharge cycle characteristics can be manufactured.

In accordance with an embodiment of the present invention, in a lateral cross-sectional shape, an area of a bottom portion of each of the plurality of protrusions which is in contact with the current collector or the common portion is larger than an area of a top portion of each of the plurality of protrusions. That is, each of the plurality of protrusions has a shape in which the bottom portion is wider than the top portion. Thus, the mechanical strength is improved, and deterioration such as pulverization or separation due to expansion and contraction of the active material caused by charge/discharge reaction can be controlled. Further, assembly of the battery is done with the use of the plurality of protrusions each having a shape in which the bottom portion is wider than the top portion for the negative electrode; in that case, even when the top portions of the plurality of protrusions are broken by being in contact with the separator or the like, the bottom portions of the plurality of protrusions having high strength tend to remain. Accordingly, the yield of the assembly to manufacture the battery can be improved.

When the surface of the active material is in contact with an electrolyte in the power storage device, the electrolyte and the active material react with each other, so that a film is formed over a surface of the active material. The film is called a solid electrolyte interface (SEI) and considered necessary to relieve the reaction between the active material and the electrolyte and for stabilization. However, when the thickness of the film is increased, carrier ions are less likely to be occluded by the active material, leading to a problem such as a reduction in conductivity of carrier ions between the active material and the electrolyte. A graphene covering the active material can suppress an increase in thickness of the film, so that a decrease in conductivity of carrier ions can be suppressed.

Silicon has lower electric conductivity than carbon, and the electric conductivity is further reduced when silicon becomes amorphous due to charge/discharge. Thus, a negative electrode in which silicon is used as an active material has high resistivity. However, since a graphene has high conductivity, by covering silicon with a graphene, electrons can transfer at sufficiently high speed in a graphene through which carrier ions pass. In addition, a graphene has a thin sheet-like shape; by providing a graphene over a plurality of protrusions, the amount of silicon in the active material layer can be increased and carrier ions can transfer more easily than in a graphite. As a result, the conductivity of carrier ions can be increased, reaction between silicon that is an active material and carrier ions can be increased, and carrier ions can be easily occluded by the active material. Accordingly, a power storage device including the negative electrode can perform charge/discharge at high speed.

When an insulating layer functioning as a spacer is provided over a graphene of a negative electrode, it is not necessary to provide a separator between the negative electrode and a positive electrode, so that the distance between the negative electrode and the positive electrode can be shortened. As a result, the amount of carrier ions transferring between the positive electrode and the negative electrode can be increased.

In accordance with an embodiment of the present invention, at least an active material including a plurality of protrusions and a graphene provided over the active material are provided, whereby a power storage device which has high charge/discharge capacity and less deterioration due to charge/discharge and can perform charge/discharge at high speed can be provided.

In accordance with an embodiment of the present invention, an active material including a plurality of protrusions and a graphene provided over the active material are provided, and in a lateral cross-sectional shape, an area of a bottom portion of each of the plurality of protrusions which is in contact with a current collector or a common portion is larger than an area of a top portion of each of the plurality of protrusions, whereby a power storage device which has high charge/discharge capacity and less deterioration due to charge/discharge and can perform charge/discharge at high speed can be provided.

BRIEF DESCRIPTION OF DRAWINGS

FIGS. 18A to 18D illustrate a method for manufacturing a negative electrode.

BEST MODE FOR CARRYING OUT THE INVENTION

Hereinafter, embodiments will be described with reference to the drawings. However, the embodiments can be implemented in many different modes, and it will be readily appreciated by those skilled in the art that modes and details thereof can be changed in various ways without departing from the spirit and the scope of the present invention. Thus, the present invention should not be interpreted as being limited to the description below of the embodiments.

Embodiment 1

In this embodiment, a structure of a negative electrode of a power storage device which is less deteriorated through charge/discharge and has excellent charge/discharge cycle characteristics and a manufacturing method thereof will be described with reference to FIGS. 1A to 1C, FIGS. 2A to 2D, FIGS. 3A to 3D, FIGS. 4A to 4C, FIGS. 5A to 5D, and FIGS. 6A to 6C.

Figure 1A:
FIGS. 1A to 1C each illustrate a negative electrode.

FIG. 1A is a cross-sectional view of a negative electrode 206. The negative electrode 206 functions as an active material.

Note that an active material refers to a material that relates to occlusion and release of carrier ions. An active material layer contains, in addition to the active material, one or more of a conductive additive, a binder, a graphene, and the like. Thus, the active material and the active material layer are distinguished from each other.

A secondary battery in which lithium ions are used as carrier ions is referred to as a lithium-ion secondary battery. As examples of carrier ions which can be used instead of lithium ions, alkali-metal ions such as sodium ions and potassium ions; alkaline-earth metal ions such as calcium ions, strontium ions, and barium ions; beryllium ions; magnesium ions; and the like are given.

A specific structure of the negative electrode 206 will be described with reference to FIGS. 1B and 1C. Typical examples of the negative electrode 206 are a negative electrode 206a and a negative electrode 206b in FIGS. 1B and 1C, respectively.

Figure 1B:
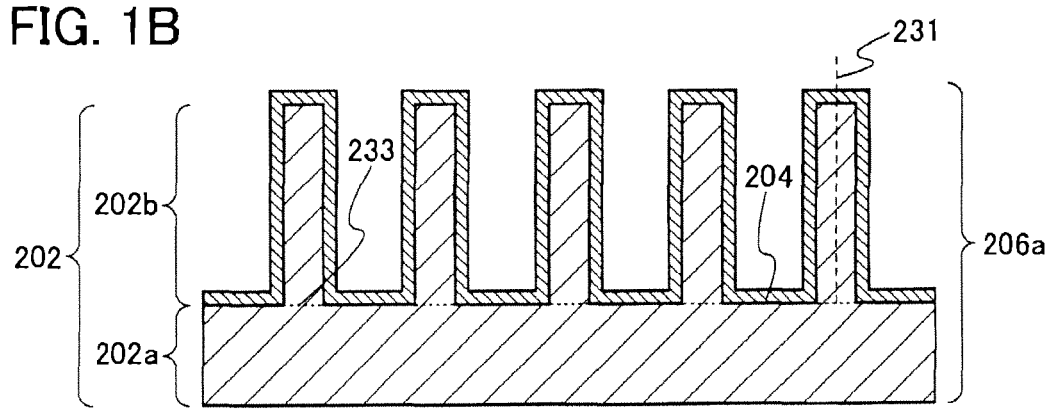

FIG. 1B is an enlarged cross-sectional view of the negative electrode 206a. The negative electrode 206a includes an active material 202 and a graphene 204 provided over the active material 202. The active material 202 includes a common portion 202a and a plurality of protrusions 202b which protrude from the common portion 202a. The graphene 204 covers at least part of the active material 202. Alternatively, the graphene 204 may cover surfaces of the common portion 202a and the plurality of protrusions 202b of the active material 202.

As the active material 202, any one of silicon, germanium, tin, aluminum, and the like, which can occlude and release ions serving as carriers, is used. Silicon which has high theoretical charge/discharge capacity is preferably used as the active material 202. Alternatively, silicon to which an impurity element imparting one conductivity type, such as phosphorus or boron, is added may be used. Silicon to which the impurity element imparting one conductivity type, such as phosphorus or boron, is added has higher conductivity, so that the conductivity of the negative electrode can be increased. Accordingly, discharge capacity can be further improved as compared to a power storage device including a negative electrode in which silicon is used as the active material 202.

The common portion 202a serves as a base layer of the plurality of protrusions 202b. The common portion 202a is a continuous layer and is contact with the plurality of protrusions 202b.

Each of the protrusions 202b can have any of the following shapes as appropriate: a columnar shape such as a cylindrical shape 221 (see FIG. 2A) or a prismatic shape, a conical shape 222 (see FIG. 2B) or a pyramidal shape, a plate-like shape 223 (see FIG. 2C), a pipe-like shape 224 (see FIG. 2D), and the like. Note that the top or the edge of the protrusion 202b may be curved. In FIG. 1B, a cylindrical protrusion is used as the protrusion 202b.

A top view of the electrode in this embodiment will be described with reference to FIGS. 3A to 3D.

Figure 3A:
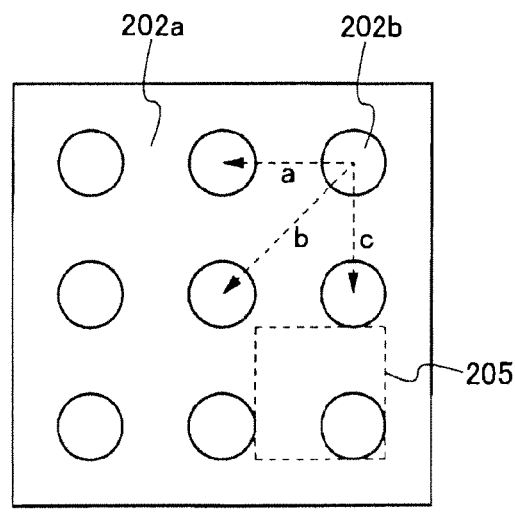
FIGS. 3A to 3D each illustrate a negative electrode.
Figure 3B:
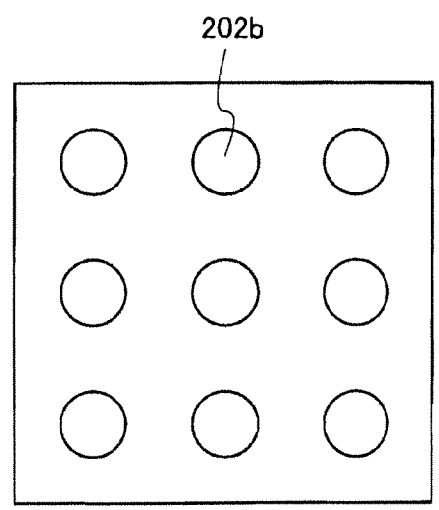

FIG. 3A is a top view illustrating the common portion 202a and the plurality of protrusions 202b which protrude from the common portion 202a. The plurality of protrusions 202b which have circular top shapes are arranged. FIG. 3B is a top view after movement of the plurality of protrusions 202b in FIG. 3A in the direction a. In FIGS. 3A and 3B, the plurality of protrusions 202b are provided at the same positions. That is, the plurality of protrusions 202b illustrated in FIG. 3A have translation symmetry. Here, the plurality of protrusions 202b in FIG. 3A move in the direction a; however, the same result as FIG. 3B can be obtained after movement in the direction b or c.

The proportion of the protrusion 202b in the unit of symmetry which is denoted by a dashed line 205 is preferably higher than or equal to 25% and lower than or equal to 60%. That is, the proportion of a space (a region without the protrusion) in the unit of symmetry is preferably higher than or equal to 40% and lower than or equal to 75%. When the proportion of the protrusion 202b in the unit of symmetry is higher than or equal to 25%, the theoretical charge/discharge capacity of the negative electrode can be higher than or equal to about 1000 mAh/g. In addition, by setting the proportion of the protrusion 202b in the unit of symmetry to lower than or equal to 60%, also when the charge/discharge capacity is maximum (i.e., theoretical capacity) and the protrusions expand, the adjacent protrusions are not in contact with each other and can be prevented from being broken. As a result, high charge/discharge capacity can be achieved and deterioration of the negative electrode due to charge/discharge can be reduced.

Figure 3C:
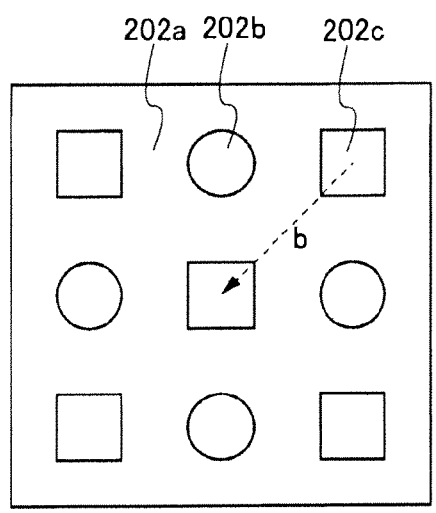
Figure 3D:
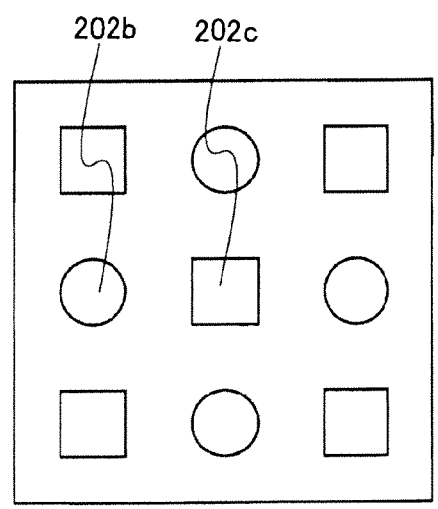

FIG. 3C is a top view illustrating the common portion 202a and a plurality of protrusions which protrude from the common portion 202a. The protrusion 202b which has a circular top shape and a protrusion 202c which has a square top shape are alternately arranged. FIG. 3D is a top view after movement of the plurality of protrusions 202b and 202c in the direction b. In the top views of FIGS. 3C and 3D, the plurality of protrusions 202b and 202c are provided at the same positions. That is, the plurality of protrusions 202b and 202c illustrated in FIG. 3C have translation symmetry.

By providing the plurality of protrusions such that they have translation symmetry, variation in electron conductivity among the plurality of protrusions can be reduced. Accordingly, local reaction in the positive electrode and the negative electrode can be reduced, reaction between carrier ions and the active material can occur uniformly, and diffusion overvoltage (concentration overvoltage) can be prevented, so that the reliability of battery characteristics can be increased.

The common portion 202a and the plurality of protrusions 202b can have a single crystal structure or a polycrystalline structure as appropriate. Alternatively, the common portion 202a can have a single crystal structure or a polycrystalline structure, and the plurality of protrusions 202b can have an amorphous structure. Further alternatively, the common portion 202a and part of the plurality of protrusions 202b can have a single crystal structure or a polycrystalline structure, and the other part of the plurality of protrusions 202b can have an amorphous structure. Note that the part of the plurality of protrusions 202b includes at least a region in contact with the common portion 202a.

The interface between the common portion 202a and the plurality of protrusions 202b is not clear. Accordingly, in the active material 202, a plane including the deepest depression among depressions between the plurality of protrusions 202b and parallel with a plane where the protrusions 202b are formed is defined as an interface 233 between the common portion 202a and the plurality of protrusions 202b.

In addition, the longitudinal directions of the plurality of protrusions 202b are oriented in the same direction. That is, axes 231 of the plurality of protrusions 202b are parallel with each other. Further, preferably, the plurality of protrusions 202b have substantially the same shapes. With such a structure, the volume of the active material can be controlled. Further, the axis 231 of the protrusion is a straight line which passes the top of the protrusion (or the center of a top surface of the protrusion) and the center of a bottom surface of the protrusion which is in contact with the common portion. That is, the axis is a straight line which passes the center of the longitudinal direction of the protrusion. When the axes of the plurality of protrusions are oriented in the same direction, the axes of the plurality of protrusions are substantially parallel with each other. Specifically, the angle between the axes of the plurality of protrusions is less than or equal to 10 degrees, preferably less than or equal to 5 degrees.

The direction in which the plurality of protrusions 202b extend from the common portion 202a is referred to as a longitudinal direction, and a cross-sectional shape parallel with the longitudinal direction is referred to as a longitudinal cross-sectional shape. In addition, a cross-sectional shape of a plane substantially perpendicular to the longitudinal direction of the plurality of protrusions 202b is referred to as a lateral cross-sectional shape.

The width of the protrusion 202b in a lateral cross-sectional shape is greater than or equal to 0.1 μm and less than or equal to 1 μm, preferably greater than or equal to 0.2 μm and less than or equal to 0.5 μm. The height of the protrusion 202b is five times to hundred times, preferably ten times to fifty times, of the width of the protrusion, typically, greater than or equal to 0.5 μm and less than or equal to 100 μm, preferably greater than or equal to 1 μm and less than or equal to 50 μm.

With the width of the protrusion 202b in a lateral cross-sectional shape being greater than or equal to 0.1 μm, the charge/discharge capacity can be increased. With the width of the protrusion 202b in a lateral cross-sectional shape being less than or equal to 1 μm, even when the plurality of protrusions expand or contract in charge and discharge, the protrusions can be prevented from being broken. In addition, with the height of the protrusion 202b being greater than or equal to 0.5 μm, the charge/discharge capacity can be increased. With the height of the protrusion 202b being less than or equal to 100 μm, even when the plurality of protrusions expand or contract in charge and discharge, the protrusions can be prevented from being broken.

The height of the protrusion 202b is a distance between the common portion 202a and the top (or the center of the top surface) of the protrusion 202b in the direction parallel with the axis which passes the top, in a longitudinal cross-sectional shape.

The plurality of protrusions 202b are provided over the common portion 202a with a predetermined distance therebetween. The distance between the plurality of protrusions 202b is preferably 1.29 times to 2 times of the width of the protrusion 202b. Consequently, even when the volume of the protrusion 202b increases due to charge of the power storage device including the negative electrode, the protrusions 202b are not in contact with each other and can be prevented from being broken, and moreover, a reduction in charge/discharge capacity of the power storage device can be prevented.

The graphene 204 functions as a conductive additive. In addition, the graphene 204 functions as an active material in some cases.

The graphene 204 includes a single-layer graphene and a multilayer graphene in its category. The graphene 204 has a sheet-like shape with a length of several micrometers.

The single-layer graphene refers to a sheet of carbon molecules having $sp^2$ bonds with a thickness of one atomic layer and is very thin. In addition, six-membered rings each composed of carbon atoms are connected in the planar direction, and poly-membered rings each formed when a carbon-carbon bond in part of a six-membered ring is broken, such as a seven-membered ring, an eight-membered ring, a nine-membered ring, and a ten-membered ring, are partly formed.

A poly-membered ring is composed of a carbon atom and an oxygen atom in some cases. Further, an oxygen atom is bonded to one of carbon atoms in a poly-membered ring composed of the carbon atoms in some cases. The above poly-membered ring is formed when a carbon-carbon bond in part of a six-membered ring is broken and an oxygen atom is bonded to a carbon atom whose bond is broken. Accordingly, an opening functioning as a path through which ions can transfer is included in the bond between the carbon atom and the oxygen atom. That is, as the proportion of oxygen atoms included in a graphene is higher, the proportion of openings each functioning as a path through which ions can transfer is increased.

When the graphene 204 contains oxygen, the proportion of oxygen in the constituent atoms of the graphene is higher than or equal to 2 at. % and lower than or equal to 11 at. %, preferably higher than or equal to 3 at. % and lower than or equal to 10 at. %. As the proportion of oxygen is lower, the conductivity of the graphene can be increased. As the proportion of oxygen is higher, more openings serving as paths of ions in the graphene can be formed.

When the graphene 204 is a multilayer graphene, the graphene 204 includes a plurality of single-layer graphenes, typically, two to hundred single-layer graphenes and thus is very thin. Since the single-layer graphene contains oxygen, the interlayer distance between the graphenes is greater than 0.34 nm and less than or equal to 0.5 nm, preferably greater than or equal to 0.38 nm and less than or equal to 0.42 nm, more preferably greater than or equal to 0.39 nm and less than or equal to 0.41 nm. In a general graphite, the interlayer distance between the single-layer graphenes is 0.34 nm. Since the interlayer distance in the graphene 204 is longer than that in a general graphite, ions can easily transfer in a direction parallel with a surface of the single-layer graphene. In addition, the graphene 204 contains oxygen and includes a single-layer graphene or a multilayer graphene in which a polymembered ring is formed and thus includes openings in places. Thus, in the case where the graphene 204 is a multilayer graphene, ions can transfer in the direction parallel with a surface of the single-layer graphene, i.e., through a gap between the single-layer graphenes, and in the direction perpendicular to a surface of the graphene, i.e., through an opening formed in each of the single-layer graphenes.

With the use of silicon as a negative electrode active material, the theoretical capacity is higher than in the case where a graphite is used as the active material; thus, silicon is advantageous in downsizing the power storage device.

In addition, since the plurality of protrusions 202b protrude from the common portion 202a in the active material 202 of the negative electrode 206, the active material 202 has a larger surface area than a plate-like active material. Axes of the plurality of protrusions are oriented in the same direction and the protrusions protrude in the direction perpendicular to the common portion, so that the density of the protrusions in the negative electrode can be increased and the surface area of the active material can be further increased. A space is provided between the plurality of protrusions. Further, a graphene is provided over the active material. Thus, even when the active material expands in charging, contact between the protrusions can be reduced. Further, even when the active material is separated, the graphene can prevent the active material from being broken. The plurality of protrusions have translation symmetry and formed with high uniformity in the negative electrode, so that local reaction can be reduced in each of the positive electrode and the negative electrode, and carrier ions and the active material can react with each other uniformly between the positive electrode and the negative electrode. Consequently, in the case where the negative electrode 206 is used for the power storage device, high-speed charge/discharge becomes possible, and breakdown and separation of the active material due to charge/discharge can be suppressed, whereby a power storage device with improved cycle characteristics can be manufactured. Furthermore, when the shapes of the protrusions are substantially the same, local charge/discharge can be reduced, and the weight of the active material can be controlled. In addition, when the heights of the protrusions are substantially the same, load can be prevented from being applied locally in the manufacturing process of the battery, which can increase the yield. Accordingly, specifications of the battery can be well controlled.

When the surface of the active material 202 is in contact with an electrolyte in the power storage device, the electrolyte and the active material react with each other, so that a film is formed over a surface of the active material. The film is called a solid electrolyte interface (SEI) which is considered necessary for relieving reaction between the active material and the electrolyte and for stabilization. However, when the film is thick, carrier ions are occluded by the active material with difficulty, which might reduce the conductivity of carrier ions between the active material and the electrolyte.

The graphene 204 covering the active material 202 can suppress an increase in thickness of the film, so that a decrease in conductivity of carrier ions can be suppressed.

A graphene has high conductivity; by covering silicon with a graphene, electrons can transfer at high speed in a graphene. In addition, a graphene has a thin sheet-like shape; by providing a graphene over a plurality of protrusions, the amount of an active material in an active material layer can be increased and carrier ions can transfer more easily than in a graphite. As a result, the conductivity of carrier ions can be increased, reaction between silicon that is an active material and carrier ions can be increased, and carrier ions can be easily occluded by the active material. Accordingly, a power storage device including the above negative electrode can perform charge/discharge at high speed.

Note that a silicon oxide layer may be provided between the active material 202 and the graphene 204. By providing the silicon oxide layer over the active material 202, ions which are carriers are inserted into silicon oxide in charging of the power storage device. As a result, a silicate compound, e.g., alkali metal silicate such as $Li_4SiO_4$, $Na_4SiO_4$, or $K_4SiO_4$, alkaline earth metal silicate such as $Ca_2SiO_4$, $Sr_2SiO_4$, or $Ba_2SiO_4$, $Be_2SiO_4$, $Mg_2SiO_4$, or the like is formed. Such a silicate compound can serve as a path through which carrier ions transfer. By providing the silicon oxide layer, expansion of the active material 202 can be suppressed. Accordingly, breakdown of the active material 202 can be suppressed while the charge/discharge capacity is maintained. In discharging after charging, not all metal ions serving as carrier ions are released from the silicate compound formed in the silicon oxide layer and part of the metal ions remain, so that the silicon oxide layer is a mixture layer of silicon oxide and the silicate compound.

In addition, the thickness of the silicon oxide layer is preferably greater than or equal to 2 nm and less than or equal to 10 nm. With the thickness of the silicon oxide layer being greater than or equal to 2 nm, expansion of the active material 202 due to charge/discharge can be relieved. In addition, with the thickness of the silicon oxide layer being less than or equal to 10 nm, carrier ions can transfer easily, which can prevent a reduction in charge capacity. By providing the silicon oxide layer over the active material 202, expansion and contraction of the active material 202 in charge/discharge can be relieved, so that the active material 202 can be prevented from being broken.

Figure 1C:
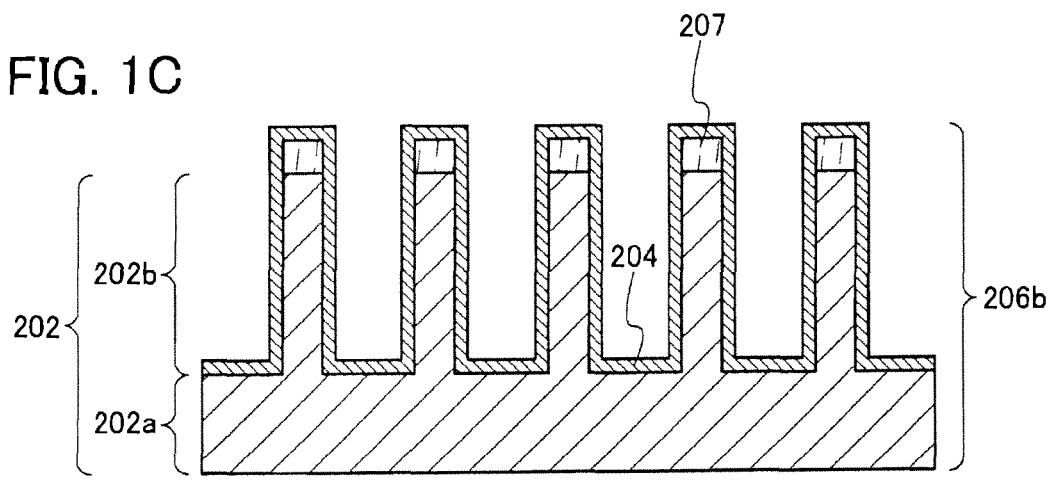
Figure 2A:
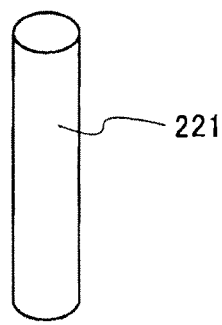
FIGS. 2A to 2D each illustrate a shape of a protrusion included in a negative electrode.
Figure 2B:
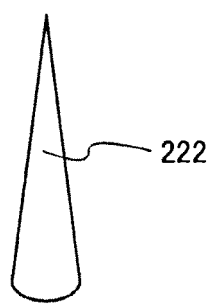
Figure 2C:
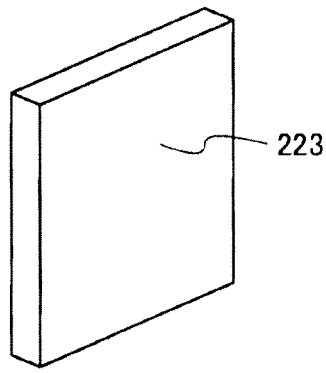
Figure 2D:
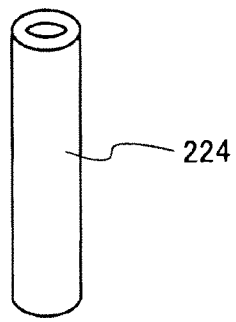

Like the negative electrode 206b illustrated in FIG. 1C, a protective layer 207 may be provided between the top of the protrusion 202b in the active material 202 and the graphene 204. In that case, a side surface of the protrusion 202b is in contact with the graphene 204.

A conductive layer, a semiconductor layer, or an insulating layer can be used for the protective layer 207 as appropriate. The thickness of the protective layer 207 is preferably greater than or equal to 100 nm and less than or equal to 10 μm. When the protective layer 207 is formed using a material whose etching rate is lower than that of the material for the active material 202, the protective layer 207 serves as a hard mask when the plurality of protrusions are formed by etching, so that variation in height between the plurality of protrusions can be reduced.

Next, a method for manufacturing the negative electrode 206 will be described with reference to FIGS. 4A to 4C. Here, as one mode of the negative electrode 206, the negative electrode 206a illustrated in FIG. 1B will be described.

Figure 4A:
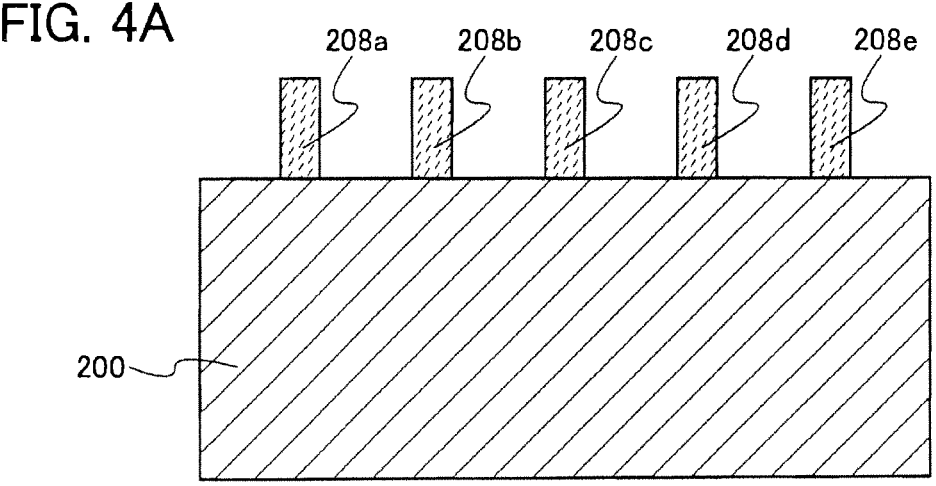
FIGS. 4A to 4C illustrate a method for manufacturing a negative electrode.

As illustrated in FIG. 4A, masks 208a to 208e are formed over a silicon substrate 200.

A single crystal silicon substrate or a polycrystalline silicon substrate is used as the silicon substrate 200. By using, as the silicon substrate, an n-type silicon substrate doped with phosphorus or a p-type silicon substrate doped with boron, an active material can be used as the negative electrode without providing the current collector.

The masks 208a to 208e can be formed by a photolithography step. Alternatively, the masks 208a to 208e can be formed by an inkjet method, a printing method, or the like.

Figure 4B:
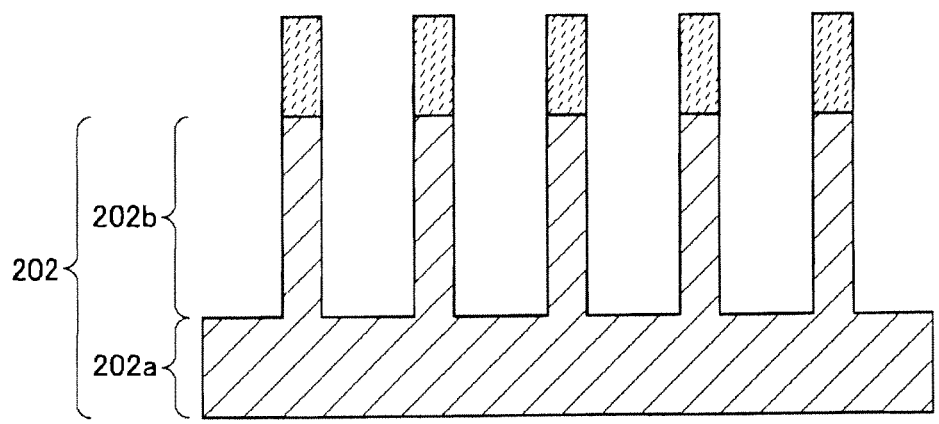

The silicon substrate 200 is selectively etched with the use of the masks 208a to 208e, so that the active material 202 is formed as illustrated in FIG. 4B. As a method for etching the silicon substrate, a dry etching method or a wet etching method can be used as appropriate. Note that when a Bosch process which is a deep etching method is used, a high protrusion can be formed.

For example, an n-type silicon substrate is etched with an inductively coupled plasma (ICP) apparatus by using, as an etching gas, chlorine, hydrogen bromide, and oxygen, whereby the active material 202 can be formed. The etching time is adjusted such that the common portion 202a remains. The flow ratio of the etching gas may be adjusted appropriate. For example, the flow ratio of chlorine, hydrogen bromide, and oxygen can be 10:15:3.

As described in this embodiment, the silicon substrate is etched with the use of the masks, whereby the plurality of protrusions whose axes are oriented in the same direction can be formed. Further, the plurality of protrusions whose shapes are substantially the same can be formed.

Figure 4C:
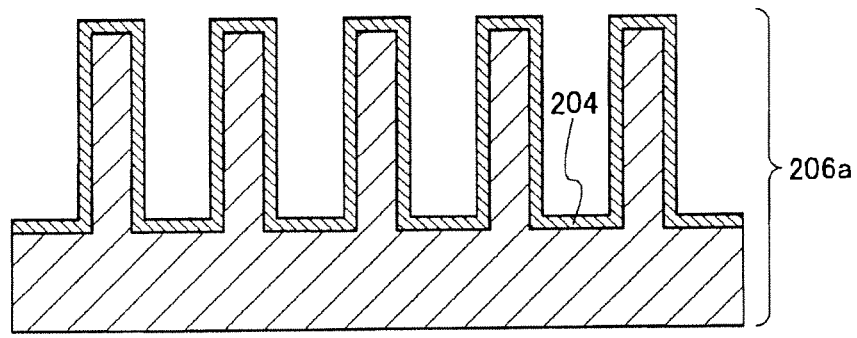

Next, the graphene 204 is formed over the active material 202, so that the negative electrode 206a can be formed as illustrated in FIG. 4C.

As a method for forming the graphene 204, there are a gas phase method and a liquid phase method. In the gas phase method, after forming, as a nucleus, nickel, iron, gold, copper, or an alloy containing such a metal over the active material 202, a graphene is grown from the nucleus in an atmosphere containing hydrocarbon such as methane or acetylene. In the liquid phase method, graphene oxide is provided over the surface of the active material 202 using a dispersion liquid containing graphene oxide, and then, graphene oxide is reduced to form a graphene.

The dispersion liquid containing graphene oxide is obtained by a method in which graphene oxide is dispersed in a solvent, a method in which after a graphite is oxidized in a solvent, graphite oxide is separated into graphene oxide to form a dispersion liquid containing graphene oxide, and the like. In this embodiment, the graphene 204 is formed over the active material 202 by using the dispersion liquid containing graphene oxide which is formed by, after oxidizing graphite, separating graphite oxide into graphene oxide.

In this embodiment, graphene oxide is formed by an oxidation method called a Hummers method. A Hummers method is as follows: a sulfuric acid solution of potassium permanganate or the like is mixed into graphite powder to cause oxidation reaction; thus, a mixed solution containing graphite oxide is formed. Graphite oxide contains a functional group such as an epoxy group, a carbonyl group including a carboxyl group, or a hydroxyl group due to oxidation of carbon in graphite. Accordingly, the interlayer distance between adjacent a plurality of graphenes in graphite oxide is longer than the interlayer distance of graphite. Then, ultrasonic vibration is transferred to the mixed solution containing graphite oxide, so that the graphite oxide whose interlayer distance is long can be cleaved to separate graphene oxide and to form a dispersion liquid containing graphene oxide. Note that a method for forming graphene oxide other than a Hummers method can be used as appropriate.

Graphene oxide includes an epoxy group, a carbonyl group including a carboxyl group, a hydroxyl group, or the like. Such a substituent has high polarity, so that graphene oxides are likely to disperse in a liquid having a polarity. In particular, since hydrogen is ionized in a liquid having a polarity, graphene oxide including a carbonyl group is ionized and different graphene oxides are more likely to disperse. Accordingly, in a liquid having a polarity, graphene oxides disperse uniformly, and in a later step, graphene oxides can be provided uniformly over the surface of the active material 202.

As a method of soaking the active material 202 in the dispersion liquid containing graphene oxide to provide graphene oxide over the active material 202, a coating method, a spin coating method, a dipping method, a spray method, an electrophoresis method, or the like may be employed. Alternatively, these methods may be combined as appropriate. With the use of an electrophoresis method, ionized graphene oxide can be electrically transferred to the active material, whereby graphene oxide can be provided also on a surface of the common portion which is not in contact with the plurality of protrusions. Accordingly, even when the plurality of protrusions are high, graphene oxide can be provided uniformly over the surfaces of the common portion and the plurality of protrusions.

In a method for reducing graphene oxide provided over the active material 202, heating may be performed at higher than or equal to 150° C., preferably higher than or equal to 200° C. and lower than or equal to the temperature which the active material 202 can withstand, in a vacuum, air, an atmosphere of an inert gas (nitrogen, a rare gas, or the like), or the like. By being heated at a higher temperature and for a longer time, graphene oxide is reduced to a higher extent so that a graphene with high purity (i.e., with a low concentration of elements other than carbon) can be obtained. In addition, there is also a method in which graphene oxide is soaked in a reducing solution to be reduced.

Since a graphite is treated with sulfuric acid according to a Hummers method, a sulfone group and the like are also bonded to graphene oxide, and its decomposition (release) is caused at higher than or equal to 200° C. and lower than or equal to 300° C., preferably higher than or equal to 200° C. and lower than or equal to 250° C. Thus, in a method for reducing graphene oxide by heating, graphene oxide is preferably reduced at higher than or equal to 200° C.

Through the reduction treatment, adjacent graphenes are bonded to each other to form a huge net-like or sheet-like shape. Further, through the reduction treatment, openings are formed in the graphenes due to the release of oxygen. Furthermore, the graphenes overlap with each other in parallel with a surface of a substrate. As a result, graphenes in which ions can transfer between layers and in openings is formed.

In accordance with this embodiment, the negative electrode 206a illustrated in FIG. 1B is formed.

A protective layer is formed over the silicon substrate 200, the masks 208a to 208e are formed over the protective layer, and separated protective layers 207 are formed with the use of the masks 208a to 208e (see FIG. 1C). After that, with the use of the masks 208a to 208e and the separated protective layers, the silicon substrate 200 is selectively etched, whereby the negative electrode 206b illustrated in FIG. 1C can be formed. When the plurality of protrusions 202b are high, that is, the etching time is long, the masks are thinned gradually in the etching step and part of the masks are removed to expose the silicon substrate 200. Accordingly, there is variation in height between the protrusions. However, by using the separated protective layers 207 as hard masks, the silicon substrate 200 can be prevented from being exposed, so that variation in height between the protrusions can be reduced.

Embodiment 2

In this embodiment, a negative electrode having a structure different from that of Embodiment 1 and a method for manufacturing the negative electrode will be described with reference to FIGS. 5A to 5D and FIGS. 6A to 6C. The negative electrode described in this embodiment is different from that of Embodiment 1 in that a current collector is provided.

Figure 5A:
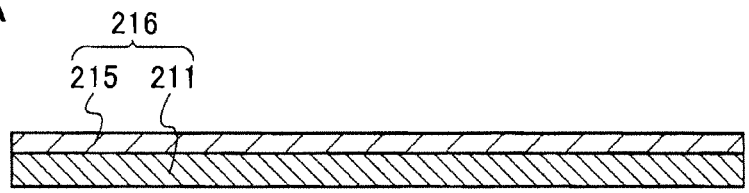
FIGS. 5A to 5D each illustrate a negative electrode.

FIG. 5A is a cross-sectional view of a negative electrode 216. In the negative electrode 216, an active material layer 215 is provided over a current collector 211.

A specific structure of the negative electrode 216 will be described with reference to FIGS. 5B to 5D. Typical examples of the active material layer 215 included in the negative electrode 216 are an active material layer 215a, an active material layer 215b, and an active material layer 215c in FIGS. 5B, 5C, and 5D, respectively.

Figure 5B:
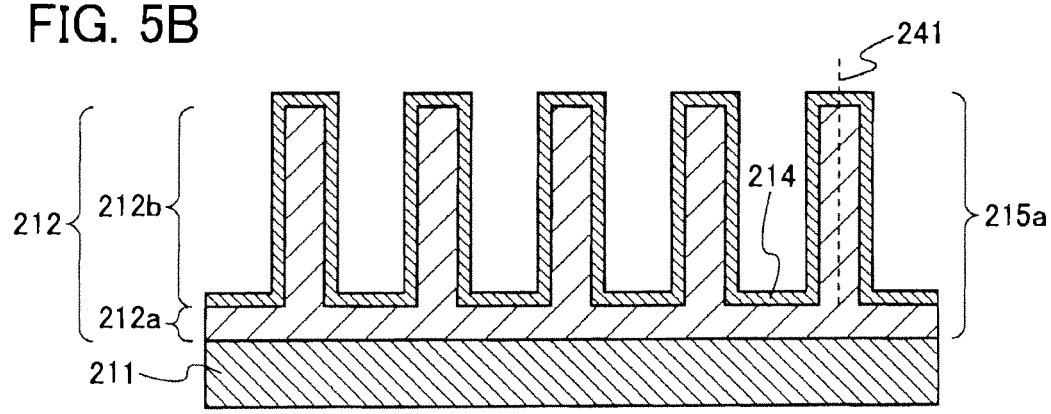

FIG. 5B is an enlarged cross-sectional view of the current collector 211 and the active material layer 215a. The active material layer 215a is provided over the current collector 211. The active material layer 215a includes an active material 212 and a graphene 214 provided over the active material 212. The active material 212 includes a common portion 212a and a plurality of protrusions 212b which protrude from the common portion 212a. In addition, the longitudinal directions of the plurality of protrusions 212b are oriented in the same direction. That is, axes 241 of the plurality of protrusions 212b are oriented in the same direction. Further, the axis 241 of the protrusion is a straight line which passes the top of the protrusion (or the center of a top surface of the protrusion) and the center of a bottom surface of the protrusion which is in contact with the common portion. That is, the axis is a straight line which passes the center of the longitudinal direction of the protrusion.

When the current collector 211 is formed using a metal material that forms silicide, in the current collector 211, a silicide layer may be formed on the side in contact with the active material 212. In the case where a metal material that forms silicide is used to form the current collector 211, titanium silicide, zirconium silicide, hafnium silicide, vanadium silicide, niobium silicide, tantalum silicide, chromium silicide, molybdenum silicide, cobalt silicide, nickel silicide, or the like is formed as a silicide layer.

The current collector 211 can be formed using a highly conductive material such as a metal typified by stainless steel, gold, platinum, zinc, iron, aluminum, copper, or titanium, or an alloy thereof. Note that the current collector 211 is preferably formed using an aluminum alloy to which an element which improves heat resistance, such as silicon, titanium, neodymium, scandium, or molybdenum, is added. Alternatively, the current collector 211 may be formed using a metal element which forms silicide by reacting with silicon. Examples of the metal element which forms silicide by reacting with silicon include zirconium, titanium, hafnium, vanadium, niobium, tantalum, chromium, molybdenum, tungsten, cobalt, nickel, and the like.

The current collector 211 can have a foil-like shape, a plate-like shape (a sheet-like shape), a net-like shape, a punching-metal shape, an expanded-metal shape, or the like as appropriate.

The active material 212 can be formed using a material similar to that of the active material 202 in Embodiment 1 as appropriate.

The common portion 212a is a layer which serves as a base layer of the plurality of protrusions 212b and is continuous over the current collector 211, similarly to the common portion 202a in Embodiment 1. In addition, the common portion 212a and the plurality of protrusions 212b are in contact with each other.

The plurality of protrusions 212b can have the same shape as the plurality of protrusions 202b in Embodiment 1 as appropriate.

The common portion 212a and the plurality of protrusions 212b can have a single crystal structure, a polycrystalline structure, or an amorphous structure as appropriate. In addition, the common portion 212a and the plurality of protrusions 212b can have a crystalline structure which is intermediate of these structures, such as a microcrystalline structure. Alternatively, the common portion 212a can have a single crystal structure or a polycrystalline structure, and the plurality of protrusions 212b can have an amorphous structure. Further alternatively, the common portion 212a and part of the plurality of protrusions 212b can have a single crystal structure or a polycrystalline structure, and the other part of the plurality of protrusions 212b can have an amorphous structure. Note that the part of the plurality of protrusions 212b includes at least a region in contact with the common portion 212a.

The width or height of the protrusion 212b can be the same as the protrusion 202b in Embodiment 1.

As the graphene 214, the graphene 204 in Embodiment 1 can be used as appropriate.

Figure 5C:
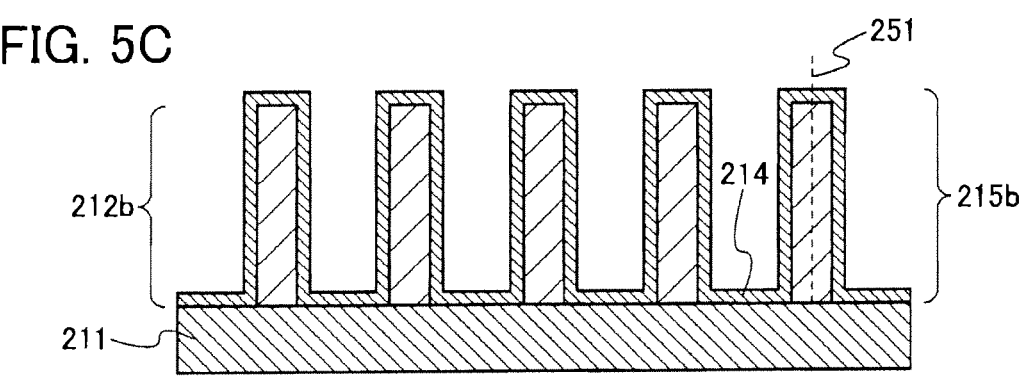

Like the active material layer 215b in FIG. 5C, the negative electrode 216 may have a structure in which the common portion is not provided, the plurality of protrusions 212b which are separated from each other are provided over the current collector 211, and the graphene 214 is formed over the current collector 211 and the plurality of protrusions 212b. Axes 251 of the plurality of protrusions 212b are oriented in the same direction. The axis 251 of the protrusion 212b is a straight line which passes the top of the protrusion (or the center of a top surface of the protrusion) and the center of a bottom surface of the protrusion 212b which is in contact with the current collector 211. That is, the axis is a straight line which passes the center of the longitudinal direction of the protrusion.

The graphene 214 is in contact with part of the current collector 211, so that electrons can flow easily in the graphene 214 and reaction between the carrier ions and the active material can be improved.

Figure 5D:
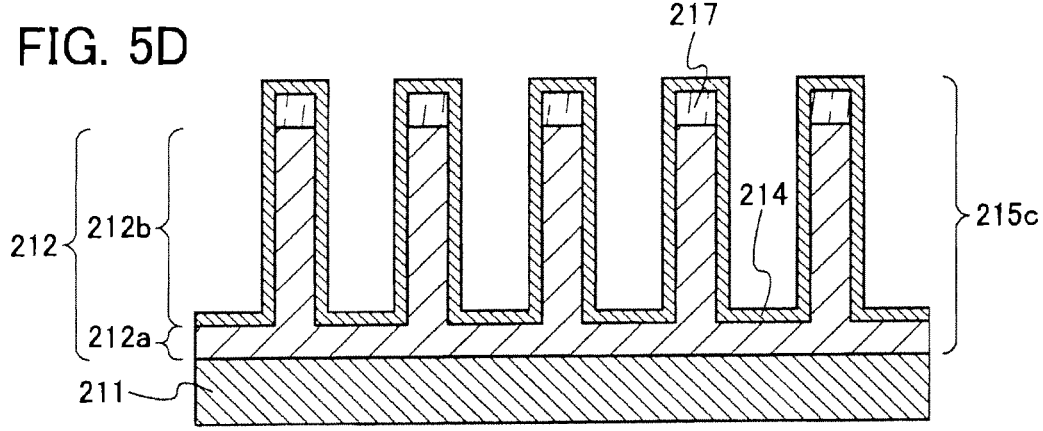

Like the active material layer 215c illustrated in FIG. 5D, a protective layer 217 may be provided between the top of the protrusion 212b and the graphene 214. A material similar to that for the protective layer 207 described in Embodiment 1 can be used for the protective layer 217 as appropriate. Description is given using the active material 212 in FIG. 5B here, but the protective layer 217 may be provided over the active material in FIG. 5C.

In the negative electrode described in this embodiment, the active material layer can be provided using the current collector 211 as a support. Accordingly, when the current collector 211 has a foil-like shape, a net-like shape, or the like so as to be flexible, a flexible negative electrode can be formed.

A method for forming the negative electrode 216 will be described with reference to FIGS. 6A to 6C. Here, as one mode of the active material layer 215, the active material layer 215a illustrated in FIG. 5B will be described.

Figure 6A:
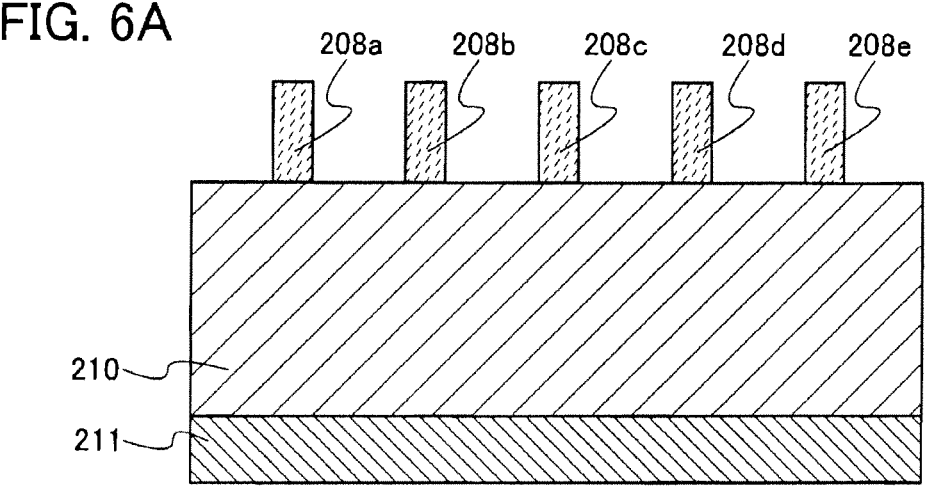
FIGS. 6A to 6C illustrate a method for manufacturing a negative electrode.

As illustrated in FIG. 6A, a silicon layer 210 is formed over the current collector 211. Then, as in Embodiment 1, masks 208a to 208e are formed over the silicon layer 210.

The silicon layer 210 can be formed by a CVD method, a sputtering method, or the like as appropriate. The silicon layer 210 is formed using single crystal silicon, polycrystalline silicon, or amorphous silicon. The silicon layer 210 may be formed using an n-type silicon layer to which phosphorus is added or a p-type silicon layer to which boron is added.

Figure 6B:
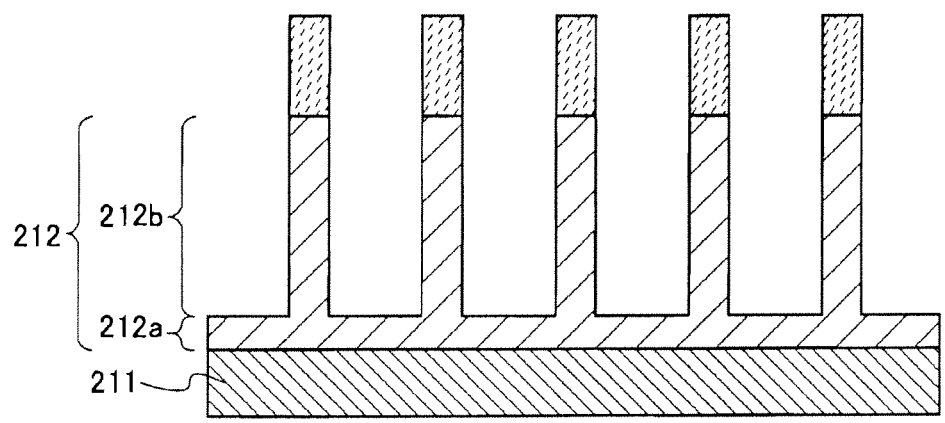
Figure 6C:
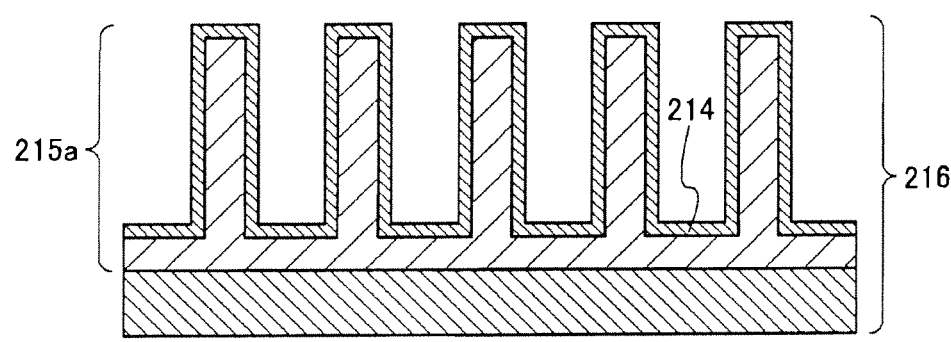

The silicon layer 210 is selectively etched with the use of the masks 208a to 208e, so that the active material 212 is formed as illustrated in FIG. 6B. As a method for etching the silicon layer 210, a dry etching method or a wet etching method can be used as appropriate. Note that when a Bosch process which is a dry etching method is used, a high protrusion can be formed.

After the masks 208a to 208e are removed, the graphene 214 is formed over the active material 212, so that the negative electrode 216 in which the active material layer 215a is provided over the current collector 211 can be manufactured.

The graphene 214 can be formed in a manner similar to that of the graphene 204 described in Embodiment 1.

Note that in FIG. 6B, when the common portion 212a is etched to expose the current collector 211, the negative electrode including the active material layer 215b illustrated in FIG. 5C can be manufactured.

A protective layer is formed over the silicon layer 210, the masks 208a to 208e are formed over the protective layer, and separated protective layers 217 are formed with the use of the masks 208a to 208e (see FIG. 5C). After that, with the use of the masks 208a to 208e and the separated protective layers 217, the silicon layer 210 is selectively etched, whereby the negative electrode including the active material layer 215c illustrated in FIG. 5D can be formed. When the plurality of protrusions 212b are high, that is, the etching time is long, the masks are thinned gradually in the etching step and part of the masks are removed to expose the silicon layer 210. Accordingly, there is variation in height between the protrusions. However, by using the separated protective layers 217 as hard masks, the silicon layer 210 can be prevented from being exposed so that variation in height between the protrusions can be reduced.

Embodiment 3

In this embodiment, a negative electrode having a structure different from those of Embodiments 1 and 2 and a method for manufacturing the negative electrode will be described with reference to FIGS. 7A to 7C, FIGS. 8A to 8D, FIGS. 9A to 9D, FIGS. 10A to 10C, and FIGS. 11A and 11B.

Figure 7A:
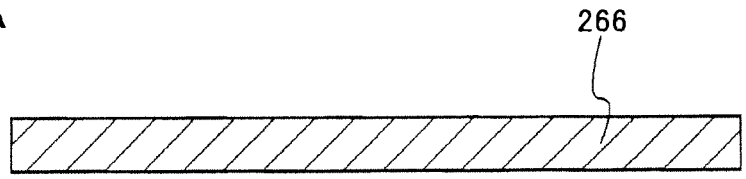
FIGS. 7A to 7C each illustrate a negative electrode.

FIG. 7A is a cross-sectional view of a negative electrode 266. The negative electrode 266 functions as an active material.

A specific structure of the negative electrode 266 will be described with reference to FIGS. 7B and 7C. Typical examples of the negative electrode 266 are a negative electrode 266a and a negative electrode 266b in FIGS. 7B and 7C, respectively.

Figure 7B:
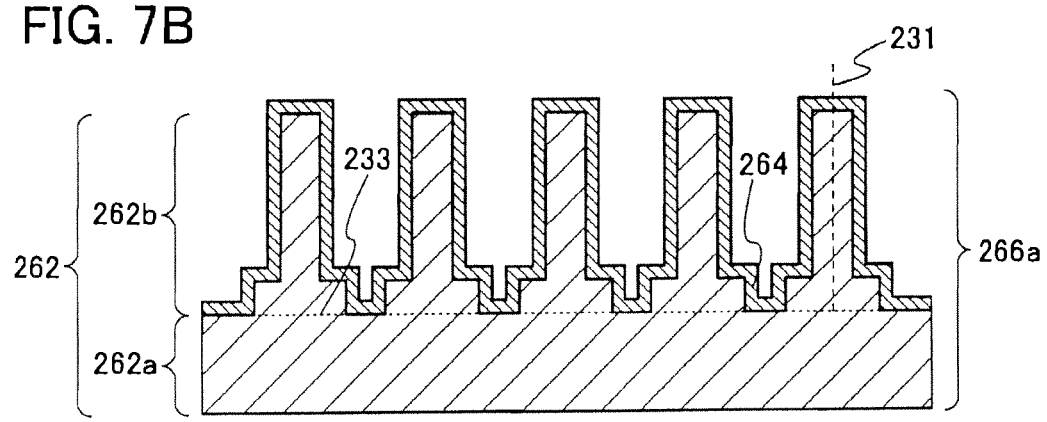

FIG. 7B is an enlarged cross-sectional view of the negative electrode 266a. The negative electrode 266a includes an active material 262 and a graphene 264 provided over the active material 262. The active material 262 includes a common portion 262a and a plurality of protrusions 262b which protrude from the common portion 262a. The graphene 264 covers at least part of the active material 262. Alternatively, the graphene 264 may cover surfaces of the common portion 262a and the plurality of protrusions 262b of the active material 262.

The active material 262 can be formed using one or more materials given for the active material 202 in Embodiment 1.

The common portion 262a serves as a base layer of the plurality of protrusions 262b. The common portion 262a is a continuous layer and is contact with the plurality of protrusions 262b.

Figure 7C:
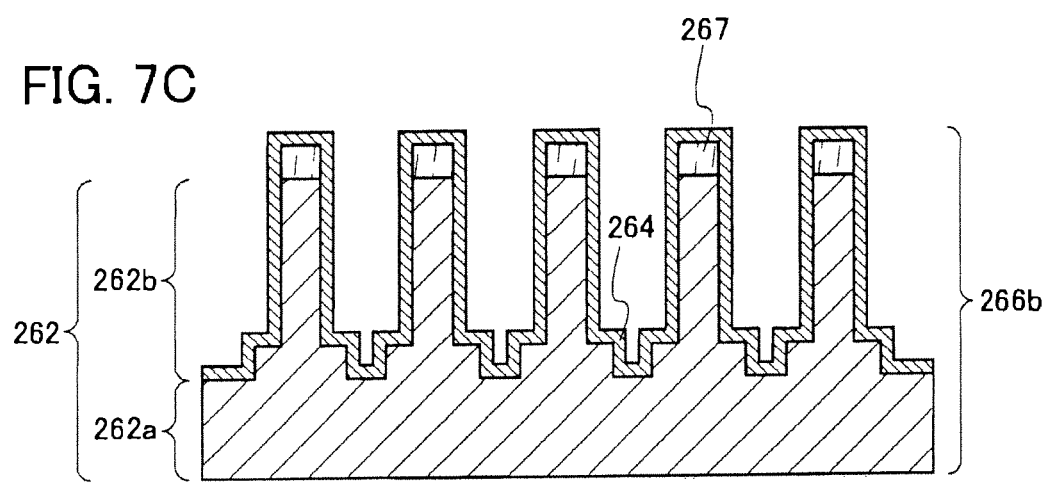
Figure 8A:
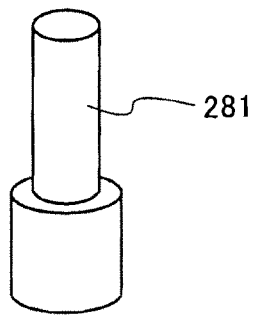
FIGS. 8A to 8D each illustrate a shape of a protrusion included in a negative electrode.
Figure 8B:
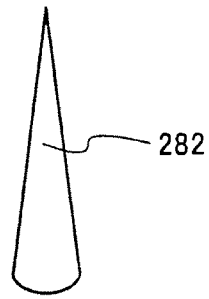
Figure 8C:
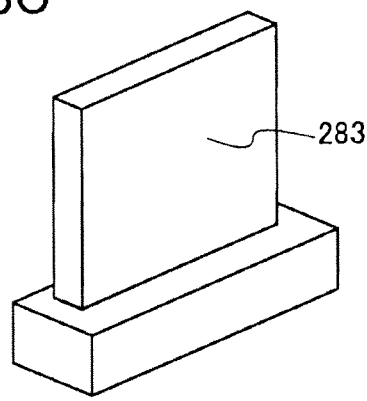
Figure 8D:
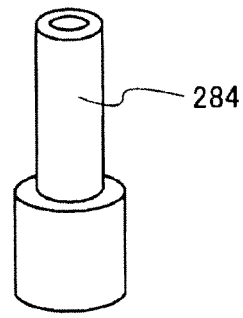

As illustrated in FIGS. 7B and 7C, the protrusion 262b has a shape in which the width of a bottom portion in contact with the common portion 262a is larger than the width of a top portion in a longitudinal cross-sectional shape. Each of the protrusions 262b can have any of the following shapes as appropriate: a columnar shape such as a cylindrical shape 281 (see FIG. 8A) or a prismatic shape, a conical shape 282 (see FIG. 8B) or a pyramidal shape, a plate-like shape 283 (see FIG. 8C), a pipe-like shape 284 (see FIG. 8D), and the like. Note that the top or the edge of the protrusion 262b may be curved. In FIG. 7B, a cylindrical protrusion is used as the protrusion 262b.

As described above, the protrusion 262b has a shape in which the width of the bottom portion in contact with the common portion 262a is larger than the width of the top portion in a longitudinal cross-sectional shape. That is, each of the plurality of protrusions has a shape in which the bottom portion is wider than the top portion. Thus, the mechanical strength is improved, and deterioration such as pulverization or separation due to expansion and contraction of the active material caused by charge/discharge reaction can be suppressed. Further, assembly of the battery is done with the use of the plurality of protrusions each having a shape in which the bottom portion is wider than the top portion for the negative electrode; in that case, even when the top portions of the plurality of protrusions are broken by being in contact with the separator or the like, the bottom portions of the plurality of protrusions having high strength tend to remain. Accordingly, the yield of the assembly to manufacture the battery can be improved.

A top view of the electrode in this embodiment will be described with reference to FIGS. 9A to 9D.

Figure 9A:
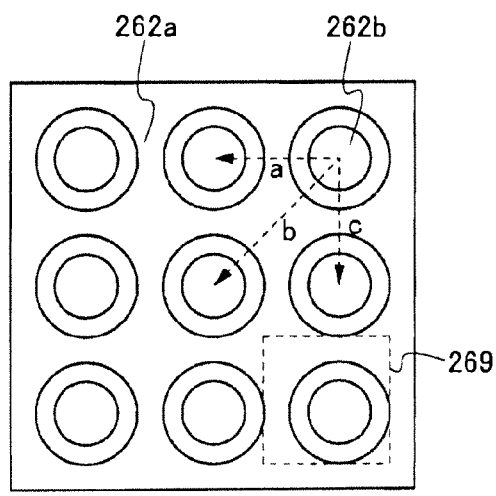
FIGS. 9A to 9D each illustrate a negative electrode.
Figure 9B:
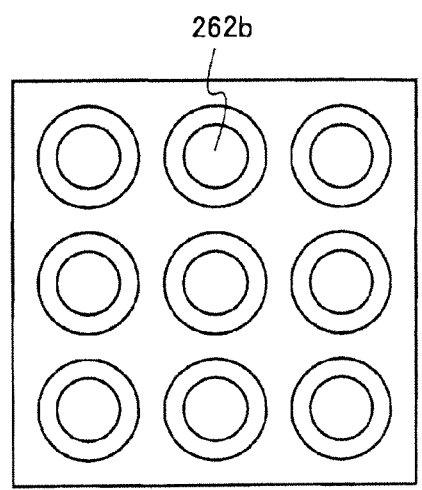

FIG. 9A is a top view illustrating the common portion 262a and the plurality of protrusions 262b which protrude from the common portion 262a. The plurality of protrusions 262b which have circular top shapes are arranged. As illustrated in FIGS. 7B and 7C, the protrusion 262b has a shape in which the width of the bottom portion in contact with the common portion 262a is larger than the width of the top portion in a longitudinal cross-sectional shape. Thus, in the top view, the protrusion 262b is denoted by two different circles. In this embodiment, although the protrusion 262b is denoted by two circles having different cross-sectional areas in the top shape, the present invention is not limited thereto, and the protrusion may be denoted by two or more circles having different cross-sectional areas. FIG. 9B is a top view after movement of the plurality of protrusions 262b in FIG. 9A in the direction a. In FIGS. 9A and 9B, the plurality of protrusions 262b are provided at the same positions. That is, the plurality of protrusions 262b illustrated in FIG. 9A have translation symmetry. Here, the plurality of protrusions 262b in FIG. 9A move in the direction a; however, the same result as FIG. 9B can be obtained after movement in the direction b or c.

The proportion of the protrusion 262b in the unit of symmetry which is denoted by a dashed line 269 is preferably higher than or equal to 25% and lower than or equal to 60%.

That is, the proportion of a space in the unit of symmetry is preferably higher than or equal to 40% and lower than or equal to 75%. When the proportion of the protrusion 262b in the unit of symmetry is higher than or equal to 25%, the theoretical charge/discharge capacity of the negative electrode can be higher than or equal to about 1000 mAh/g. In addition, by setting the proportion of the protrusion 262b in the unit of symmetry to lower than or equal to 60%, also when the charge/discharge capacity is maximum (i.e., theoretical capacity) and the protrusions expand, the adjacent protrusions are not in contact with each other and can be prevented from being broken. As a result, high charge/discharge capacity can be obtained and deterioration of the negative electrode due to charge/discharge can be reduced.

Figure 9C:
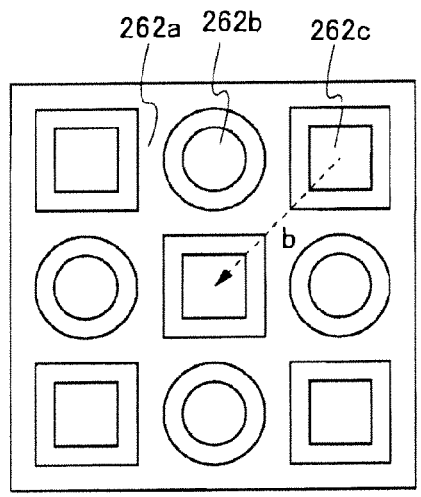
Figure 9D:
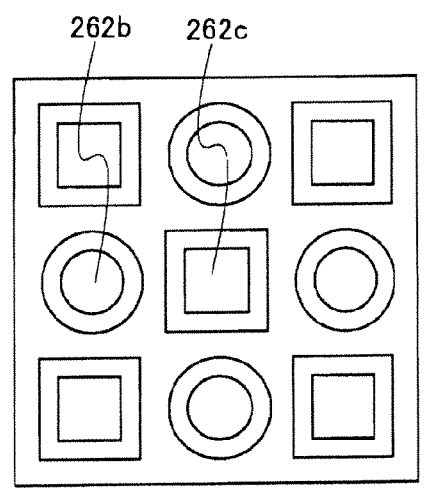

FIG. 9C is a top view illustrating the common portion 262a and a plurality of protrusions which protrude from the common portion 262a. The protrusion 262b which has a circular top shape and a protrusion 262c which has a square top shape are alternately arranged. FIG. 9D is a top view after movement of the plurality of protrusions 262b and 262c in the direction b. In the top views of FIGS. 9C and 9D, the plurality of protrusions 262b and 262c are provided at the same positions. That is, the plurality of protrusions 262b and 262c illustrated in FIG. 9C have translation symmetry.

By providing the plurality of protrusions such that they have translation symmetry, variation in electron conductivity among the plurality of protrusions can be reduced. Accordingly, local reaction in the positive electrode and the negative electrode can be reduced, reaction between carrier ions and the active material can occur uniformly, and diffusion overvoltage (concentration overvoltage) can be prevented, so that the reliability of battery characteristics can be increased.

The common portion 262a and the plurality of protrusions 262b can have a single crystal structure or a polycrystalline structure as appropriate. Alternatively, the common portion 262a can have a single crystal structure or a polycrystalline structure, and the plurality of protrusions 262b can have an amorphous structure. Further alternatively, the common portion 262a and part of the plurality of protrusions 262b can have a single crystal structure or a polycrystalline structure, and the other part of the plurality of protrusions 262b can have an amorphous structure. Note that the part of the plurality of protrusions 262b includes at least a region in contact with the common portion 262a.

The interface between the common portion 262a and the plurality of protrusions 262b is not clear. Accordingly, in the active material 262, a plane including the deepest depression among depressions between the plurality of protrusions 262b and parallel with a plane where the protrusions 262b are formed is defined as an interface 233 between the common portion 262a and the plurality of protrusions 262b.

In addition, the longitudinal directions of the plurality of protrusions 262b are oriented in the same direction. That is, axes 231 of the plurality of protrusions 262b are oriented in the same direction. Preferably, the plurality of protrusions 262b have substantially the same shapes. With such a structure, the volume of the active material can be controlled. Further, the axis 231 of the protrusion is a straight line which passes the top of the protrusion (or the center of a top surface of the protrusion) and the center of a bottom surface of the protrusion which is in contact with the common portion. That is, the axis is a straight line which passes the center of the longitudinal direction of the protrusion. When the axes of the plurality of protrusions are oriented in the same direction, the axes of the plurality of protrusions are substantially parallel with each other. Specifically, the angle between the axes of the plurality of protrusions is less than or equal to 10 degrees, preferably less than or equal to 5 degrees.

The direction in which the plurality of protrusions 262b extend from the common portion 262a is referred to as a longitudinal direction, and a cross-sectional shape parallel with the longitudinal direction is referred to as a longitudinal cross-sectional shape. In addition, a cross-sectional shape of a plane substantially perpendicular to the longitudinal direction of the plurality of protrusions 262b is referred to as a lateral cross-sectional shape.

The width of the bottom portion of the protrusion 262b in a lateral cross-sectional shape is greater than or equal to 0.1 μm and less than or equal to 1 μm, preferably greater than or equal to 0.2 μm and less than or equal to 0.5 μm. The height of the protrusion 262b is five times to hundred times, preferably ten times to fifty times of the width of the bottom portion of the protrusion 262b, typically, greater than or equal to 0.5 μm and less than or equal to 100 μm, preferably greater than or equal to 1 μm and less than or equal to 50 μm.

With the width of the bottom portion of the protrusion 262b in a lateral cross-sectional shape being greater than or equal to 0.1 μm, the charge/discharge capacity can be increased. With the width of the bottom portion of the protrusion 262b in a lateral cross-sectional shape being less than or equal to 1 μm, even when the plurality of protrusions expand in charge/discharge, the protrusions can be prevented from being broken. In addition, with the height of the protrusion 262b being greater than or equal to 0.5 μm, the charge/discharge capacity can be increased. With the height of the protrusion 262b being less than or equal to 100 μm, even when the plurality of protrusions expand in charge/discharge, the protrusions can be prevented from being broken.

The height of the protrusion 262b is a distance between the common portion 262a and the top (or the center of the top surface) of the protrusion 262b in the direction parallel with the axis which passes the top, in a longitudinal cross-sectional shape.

The plurality of protrusions 262b are provided over the common portion 262a with a predetermined distance therebetween. The distance between the plurality of protrusions 262b is preferably 1.29 times to 2 times of the width of the bottom portion of the protrusion 262b. Consequently, even when the volume of the protrusion 262b increases due to charge of the power storage device including the negative electrode, the protrusions 262b are not in contact with each other and can be prevented from being broken, and moreover, a reduction in charge/discharge capacity of the power storage device can be prevented.

The graphene 264 functions as a conductive additive. The graphene 264 functions as an active material in some cases. The graphene 204 described in Embodiment 1 can be used as the graphene 264 as appropriate.

In addition, since the plurality of protrusions 262b protrude from the common portion 262a in the active material 262 of the negative electrode 266, the active material 262 has a larger surface area than a plate-like active material. Axes of the plurality of protrusions are oriented in the same direction and the protrusions protrude in the direction perpendicular to the common portion, so that the density of the protrusions in the negative electrode can be increased and the surface area thereof can be further increased. A space is provided between the plurality of protrusions. Further, a graphene covers the active material. Thus, even when the active material expands in charging, contact between the protrusions can be reduced. Moreover, also when the active material is separated, a graphene can prevent breakdown of the active material. The plurality of protrusions have translation symmetry and formed with high uniformity in the negative electrode, so that local reaction can be reduced in each of the positive electrode and the negative electrode, and carrier ions and the active material can react with each other uniformly between the positive electrode and the negative electrode. Consequently, in the case where the negative electrode 266 is used for the power storage device, high-speed charge/discharge becomes possible, and breakdown and separation of the active material due to charge/discharge can be suppressed, whereby a power storage device with improved cycle characteristics can be manufactured. Furthermore, when the shapes of the protrusions are substantially the same, local charge/discharge can be reduced, and the weight of the active material can be controlled. In addition, when the heights of the protrusions are substantially the same, load can be prevented from being applied locally in the manufacturing process of the battery, which can increase the yield. Accordingly, specifications of the battery can be well controlled.

When the surface of the active material 262 is in contact with an electrolyte in the power storage device, the electrolyte and the active material react with each other, so that a film is formed over a surface of the active material. The film is called a solid electrolyte interface (SEI) which is considered necessary for relieving reaction between the active material and the electrolyte and for stabilization. However, when the film is thick, carrier ions are occluded by the active material with difficulty, which might reduce the conductivity of carrier ions between the active material and the electrolyte.

The graphene 264 covering the active material 262 can suppress an increase in thickness of the film, so that a decrease in conductivity of carrier ions can be suppressed.

A graphene has high conductivity; by covering silicon with a graphene, electrons can transfer at sufficiently high speed in a graphene. In addition, a graphene has a thin sheet-like shape; by covering a plurality of protrusions with a graphene, the amount of the active material in the active material layer can be increased and carrier ions can transfer more easily than in a graphite. As a result, the conductivity of carrier ions can be increased, reaction between silicon that is an active material and carrier ions can be increased, and carrier ions can be easily occluded by the active material. Accordingly, a power storage device including the negative electrode can perform charge/discharge at high speed.

Note that a silicon oxide layer may be provided between the active material 262 and the graphene 264 like the silicon oxide layer between the active material 202 and the graphene 204 in Embodiment 1. In that case, side surfaces of the plurality of protrusion 262b are in contact with the graphene 264.

Like the negative electrode 266b illustrated in FIG. 7C, a protective layer 277 may be provided between the top of the protrusion 262b in the active material 262 and the graphene 264.

The protective layer 277 can be formed in a manner similar to that of the protective layer 207 described in Embodiment 1.

Next, a method for manufacturing the negative electrode 266 will be described with reference to FIGS. 10A to 10C and FIGS. 11A and 11B. Here, as one mode of the negative electrode 266, the negative electrode 266a illustrated in FIG. 7B will be described.

Figure 10A:
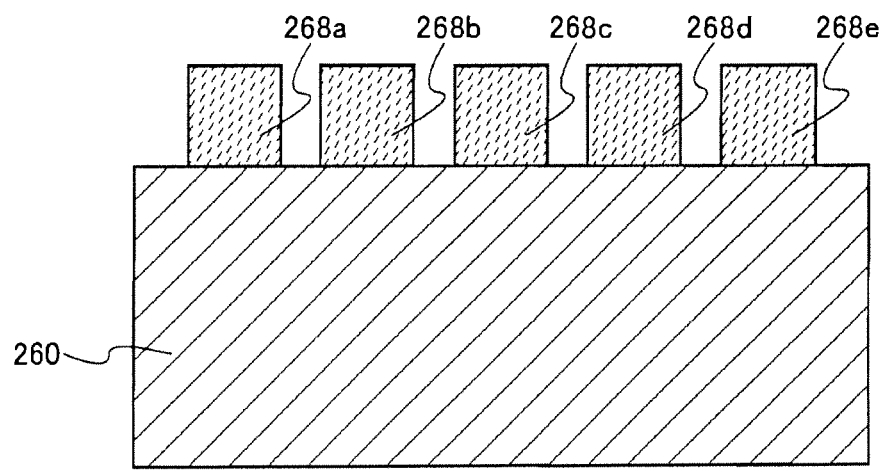
FIGS. 10A to 10C illustrate a method for manufacturing a negative electrode.

As illustrated in FIG. 10A, masks 268a to 268e are formed over a silicon substrate 260.

As the silicon substrate 260, the silicon substrate 200 described in Embodiment 1 can be used as appropriate.

The masks 268a to 268e can be formed in a manner similar to that of the masks 208a to 208e described in Embodiment 1.

Figure 10B:
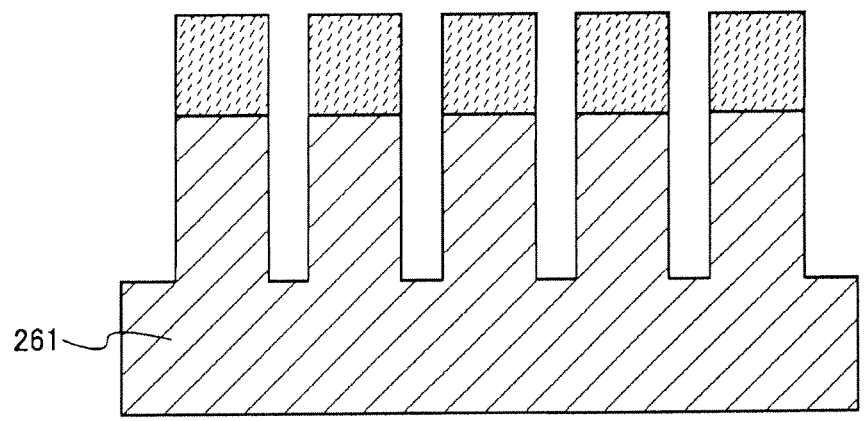

The silicon substrate 260 is selectively etched with the use of the masks 268a to 268e, so that an active material 261 is formed as illustrated in FIG. 10B. As a method for etching the silicon substrate 260, an etching method used for etching the silicon substrate 200 can be used as appropriate.

Figure 10C:
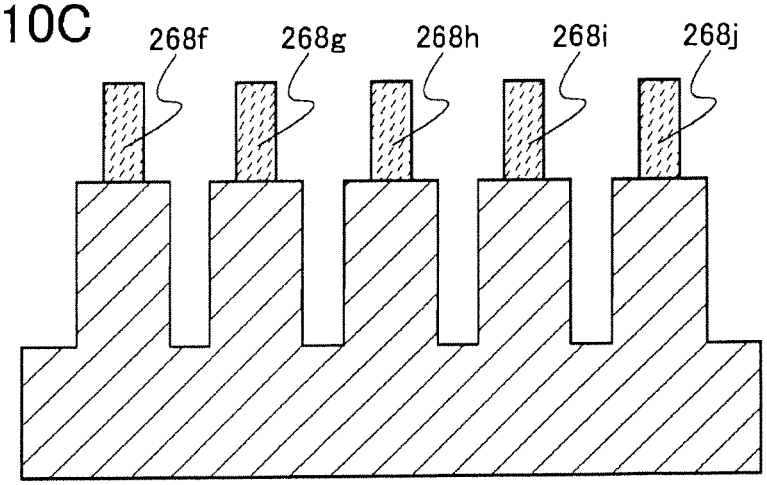

Then, the masks 268a to 268e are reduced in size by oxygen plasma treatment or the like, so that masks 268f to 268j are formed as illustrated in FIG. 10C.

Figure 11A:
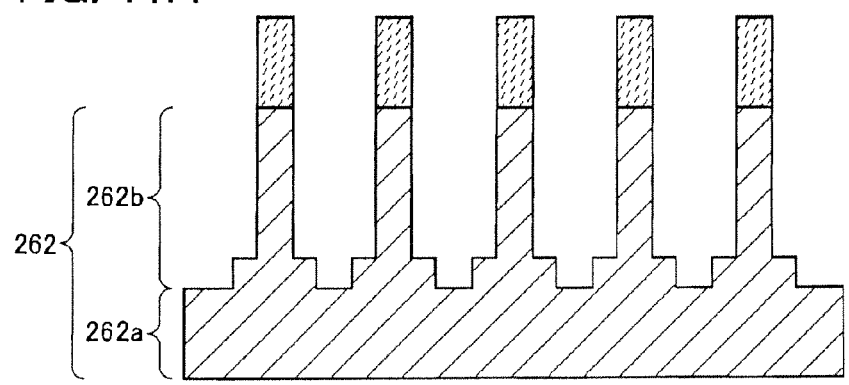
FIGS. 11A and 11B illustrate a method for manufacturing a negative electrode.

With the use of the masks 268f to 268j, the active material 261 is selectively etched, so that as illustrated in FIG. 11A, the active material 262 including the common portion 262a and the plurality of protrusions 262b can be formed. In this embodiment, etching time is adjusted such that the common portion 262a remains and the protrusion 262b has a shape in which the width of the bottom portion in contact with the common portion 262a is larger than the width of the top portion in a longitudinal cross-sectional shape. Etching of the active material 261 can be performed in a manner similar to that of the silicon substrate 260.

As described in this embodiment, the silicon substrate is etched with the use of the masks, whereby the plurality of protrusions whose axes are oriented in the same direction can be formed. Further, the plurality of protrusions whose shapes are substantially the same can be formed.

Figure 11B:
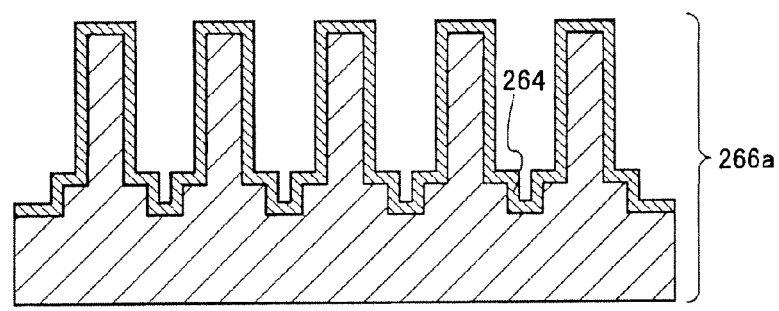

After the masks 268f to 268j are removed, the graphene 264 is formed over the active material 262, whereby the negative electrode 266a as illustrated in FIG. 11B can be manufactured.

The graphene 264 can be formed by a method for forming the graphene 204 described in Embodiment 1 as appropriate.

In accordance with this embodiment, the negative electrode 266a illustrated in FIG. 7B can be formed.

The negative electrode 266b illustrated in FIG. 7C can be formed in such a manner that: a protective layer is formed over the silicon substrate 260, the masks 268a to 268e are formed over the protective layer, separated protective layers are formed with the use of the masks 268a to 268e, the silicon substrate 260 is selectively etched with the use of the masks 268a to 268e and the separated protective layers, the masks 268a to 268e are reduced in size by oxygen plasma treatment or the like to form the masks 268f to 268j and protective layers 267 (see FIG. 7C), and etching is further performed selectively with the use of the masks 268f to 268j and the separated protective layers 267. When the plurality of protrusions 262b are high, that is, the etching time is long, the masks are thinned gradually in the etching step and part of the masks are removed to expose the silicon substrate 260. Accordingly, there is variation in height between the protrusions. However, by using the separated protective layers 267 as hard masks, the silicon substrate 260 can be prevented from being exposed so that variation in height between the protrusions can be reduced.

Embodiment 4

In this embodiment, a negative electrode having a structure different from those of Embodiments 1 to 3 and a method for manufacturing the negative electrode will be described with reference to FIGS. 12A to 12D, FIGS. 13A to 13C, and FIGS. 14A and 14B. The negative electrode described in this embodiment is different from those of Embodiments 1 to 3 in that a current collector is provided. Further, the shape of the protrusion is different from that in Embodiment 2.

Figure 12A:
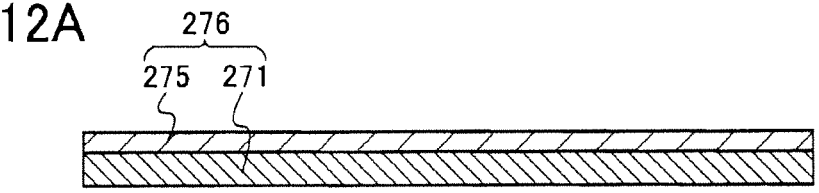
FIGS. 12A to 12D each illustrate a negative electrode.

FIG. 12A is a cross-sectional view of a negative electrode 276. In the negative electrode 276, an active material layer 275 is provided over a current collector 271.

A specific structure of the negative electrode 276 will be described with reference to FIGS. 12B to 12D. Typical examples of the active material layer 275 included in the negative electrode 276 are an active material layer 275a, an active material layer 275b, and an active material layer 275c in FIGS. 12B, 12C, and 12D, respectively.

Figure 12B:
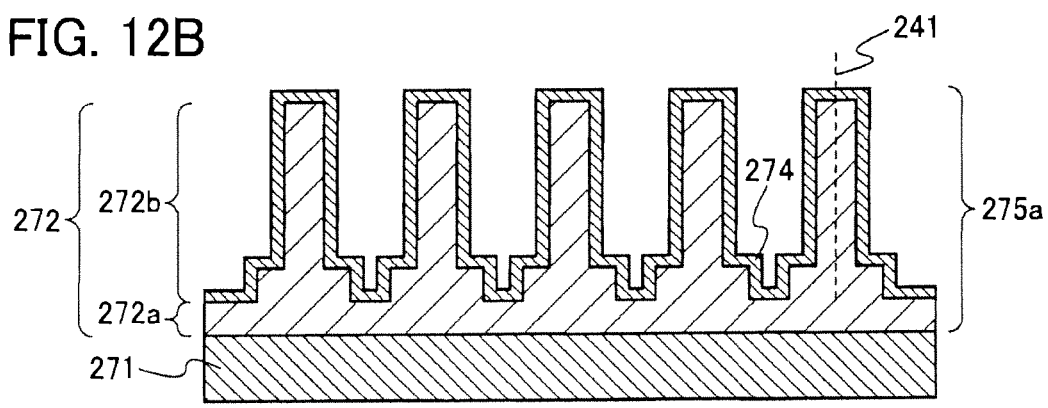

FIG. 12B is an enlarged cross-sectional view of the current collector 271 and the active material layer 275a. The active material layer 275a is provided over the current collector 271. The active material layer 275a includes an active material 272 and a graphene 274 provided over the active material 272. The active material 272 includes a common portion 272a and a plurality of protrusions 272b which protrude from the common portion 272a. In addition, the longitudinal directions of the plurality of protrusions 272b are oriented in the same direction. That is, axes 241 of the plurality of protrusions 272b are oriented in the same direction.

Figure 12C:
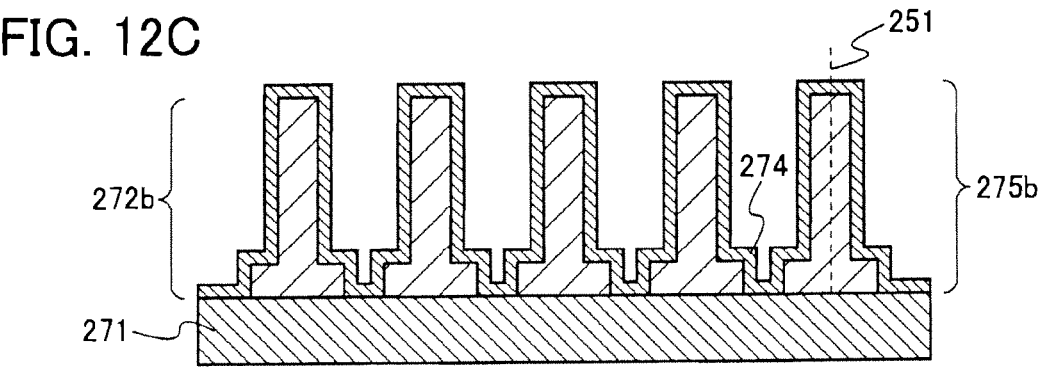
Figure 12D:
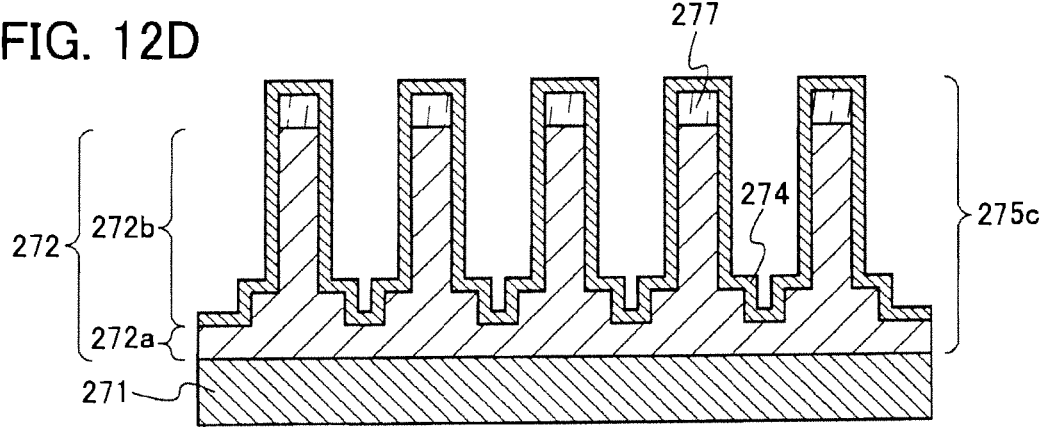

As illustrated in FIGS. 12B to 12D, the protrusion 272b has a shape in which the width of a bottom portion in contact with the common portion or the current collector is larger than the width of a top portion in a longitudinal cross-sectional shape.

As described above, the protrusion 272b has a shape in which the width of the bottom portion in contact with the common portion or the current collector is larger than the width of the top portion in a longitudinal cross-sectional shape. That is, each of the plurality of protrusions has a shape in which the bottom portion is wider than the top portion. Thus, the mechanical strength is improved, and deterioration such as pulverization or separation due to expansion and contraction of the active material caused by charge/discharge reaction can be suppressed. Further, assembly of the battery is done with the use of the plurality of protrusions each having a shape in which the bottom portion is wider than the top portion for the negative electrode; in that case, even when the top portions of the plurality of protrusions are broken by being in contact with the separator or the like, the bottom portions of the plurality of protrusions having high strength tend to remain. Accordingly, the yield of the assembly to manufacture the battery can be improved.

As the current collector 271, the current collector 211 described in Embodiment 2 can be used as appropriate.

The active material 272 can be formed using a material similar to that of the active material 202 in Embodiment 1.

The common portion 272a is a layer which serves as a base layer of the plurality of protrusions 272b and is continuous over the current collector 271, similarly to the common portion 262a in Embodiment 3. In addition, the common portion 272a and the plurality of protrusions 272b are in contact with each other.

The plurality of protrusions 272b can have the same shape as the plurality of protrusions 262b in Embodiment 3 as appropriate.

The common portion 272a and the plurality of protrusions 272b can have a single crystal structure, a polycrystalline structure, or an amorphous structure as appropriate. In addition, the common portion 272a and the plurality of protrusions 272b can have a crystalline structure which is intermediate of these structures, such as a microcrystalline structure. Alternatively, the common portion 272a can have a single crystal structure or a polycrystalline structure, and the plurality of protrusions 272b can have an amorphous structure. Further alternatively, the common portion 272a and part of the plurality of protrusions 272b can have a single crystal structure or a polycrystalline structure, and the other part of the plurality of protrusions 272b can have an amorphous structure. Note that the part of the plurality of protrusions 272b includes at least a region in contact with the common portion 272a.

The width or height of the protrusion 272b can be the same as the protrusion 262b in Embodiment 3.

As the graphene 274, a graphene having a structure similar to that of the graphene 264 in Embodiment 3 can be used as appropriate.

Like the active material layer 275b in FIG. 12C, the negative electrode 276 may have a structure in which the common portion is not provided, the plurality of protrusions 272b which are separated from each other are provided over the current collector 271, and the graphene 274 is formed over the current collector 271 and the plurality of protrusions 272b. Axes 251 of the plurality of protrusions 272b are oriented in the same direction.

The graphene 274 is in contact with part of the current collector 271, so that electrons can flow easily in the graphene 274 and reaction between the carrier ions and the active material can be improved.

Like the active material layer 275c illustrated in FIG. 12D, a protective layer 277 may be provided between the top of the protrusion 272b and the graphene 274. A material similar to that for the protective layer 207 described in Embodiment 1 can be used for the protective layer 277 as appropriate. Description is given using the active material 272 in FIG. 12B here, but the protective layer 277 may be provided over the active material in FIG. 12C.

In the negative electrode described in this embodiment, the active material layer can be provided using the current collector 271 as a support. Accordingly, when the current collector 271 has a foil-like shape, a net-like shape, or the like so as to be flexible, a flexible negative electrode can be formed.

A method for forming the negative electrode 276 will be described with reference to FIGS. 13A to 13C and FIGS. 14A and 14B. Here, as one mode of the active material layer 275, the active material layer 275a illustrated in FIG. 12B will be described.

Figure 13A:
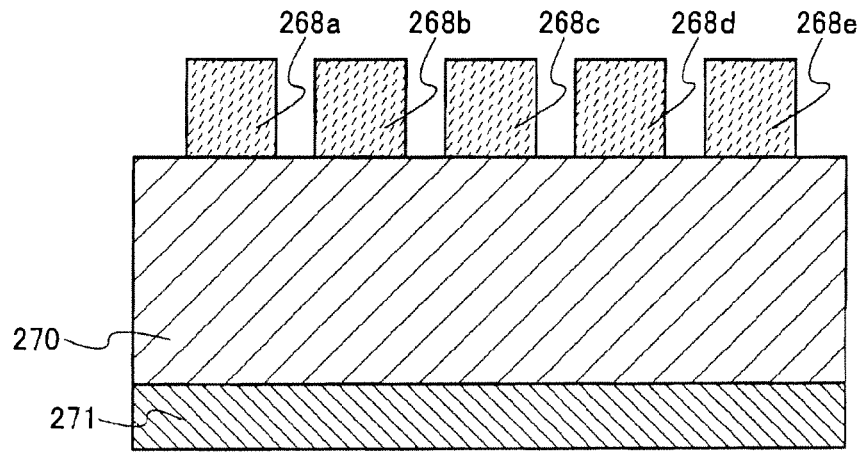
FIGS. 13A to 13C illustrate a method for manufacturing a negative electrode.

As illustrated in FIG. 13A, a silicon layer 270 is formed over the current collector 271 as in Embodiment 2. Then, as in Embodiment 1, masks 268a to 268e are formed over the silicon layer 270.

Figure 13B:
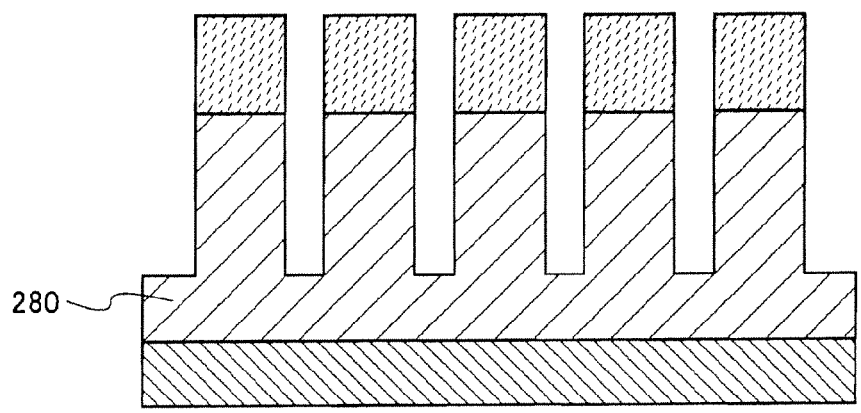

The silicon layer 270 is selectively etched with the use of the masks 268a to 268e, so that an active material 280 is formed as illustrated in FIG. 13B. As a method for etching the silicon layer 270, an etching method described in Embodiment 1 can be used as appropriate.

Figure 13C:
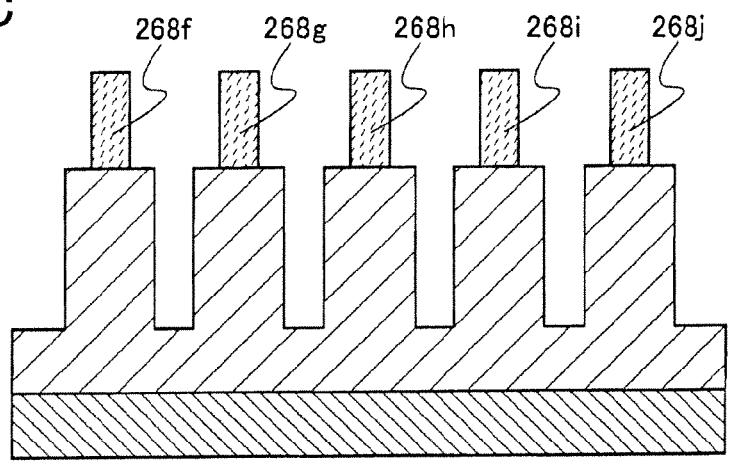

Then, the masks 268a to 268e are reduced in size by oxygen plasma treatment or the like, so that masks 268f to 268j are formed as illustrated in FIG. 13C.

Figure 14A:
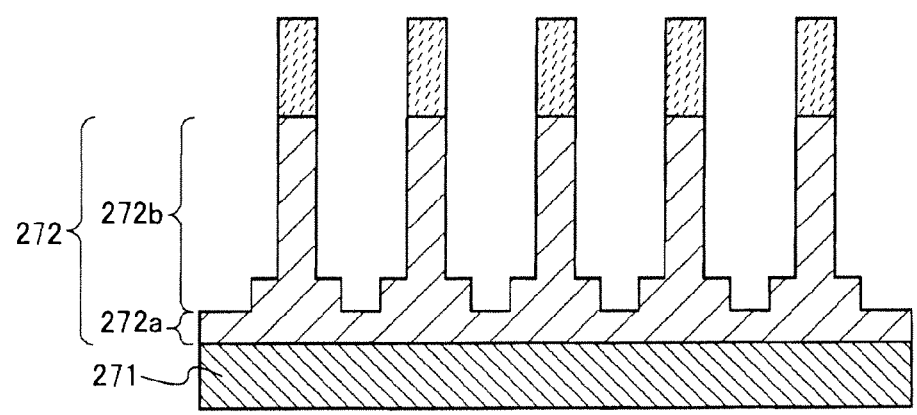
FIGS. 14A and 14B illustrate a method for manufacturing a negative electrode.

With the use of the masks 268f to 268j, the active material 280 is selectively etched, so that as illustrated in FIG. 14A, the active material 272 including the common portion 272a and the plurality of protrusions 272b can be formed. In this embodiment, etching time is adjusted such that the common portion 272a remains and the protrusion 272 has a shape in which the width of the bottom portion in contact with the common portion 272a is larger than the width of the top portion in a longitudinal cross-sectional shape. Etching of the active material 280 can be performed in a manner similar to that of the etching of the silicon layer 270.

Figure 14B:
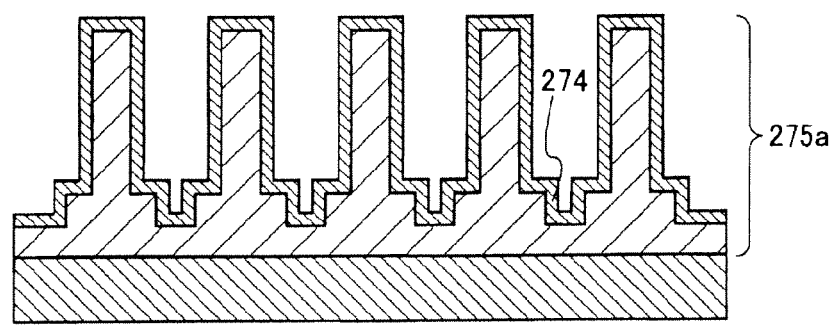

After the masks 268f to 268j are removed, the graphene 274 is formed over the active material 272, so that as illustrated in FIG. 14B, the negative electrode in which the active material layer 275a is provided over the current collector 271 can be manufactured.

The graphene 274 can be formed in a manner similar to that of the graphene 204 described in Embodiment 1.

Note that in FIG. 14A, when the common portion 272a is etched to expose the current collector 271, the negative electrode including the active material layer 275b illustrated in FIG. 12C can be manufactured.

The negative electrode illustrated in FIG. 12D can be formed in such a manner that: a protective layer is formed over the silicon layer 270, the masks 268a to 268e are formed over the protective layer, separated protective layers are formed with the use of the masks 268a to 268e, the silicon layer 270 is selectively etched with the use of the masks 268a to 268e and the separated protective layers, the masks 268a to 268e are reduced in size by oxygen plasma treatment or the like to form the masks 268f to 268j and protective layers 277 (see FIG. 12D), and etching is further performed selectively with the use of the masks 268f to 268j and the separated protective layers 277. When the plurality of protrusions 272b are high, that is, the etching time is long, the masks are thinned gradually in the etching step and part of the masks are removed to expose the silicon layer 270. Accordingly, there is variation in height between the protrusions. However, by using the separated protective layers 277 as hard masks, the silicon layer 270 can be prevented from being exposed so that variation in height between the protrusions can be reduced.

Embodiment 5

In this embodiment, a negative electrode having a structure different from those of Embodiments 1 to 4 and a method for manufacturing the negative electrode will be described with reference to FIGS. 15A to 15C, FIGS. 16A to 16C, and FIGS. 17A to 17C. In this embodiment, description is made using Embodiment 1; however, this embodiment can also be applied to Embodiment 3 as appropriate.

Figure 15A:
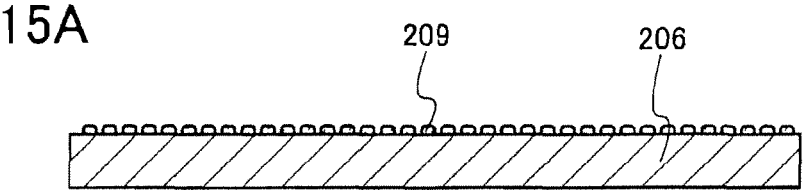
FIGS. 15A to 15C each illustrate a negative electrode.

FIG. 15A is a cross-sectional view of a negative electrode 206. The negative electrode 206 functions as an active material. An insulating layer functioning as a spacer (hereinafter referred to as a spacer 209) is provided over the negative electrode 206.

A specific structure of the negative electrode 206 will be described with reference to FIGS. 15B and 15C. Typical examples of the negative electrode 206 are a negative electrode 206a and a negative electrode 206b in FIGS. 15B and 15C, respectively.

Figure 15B:
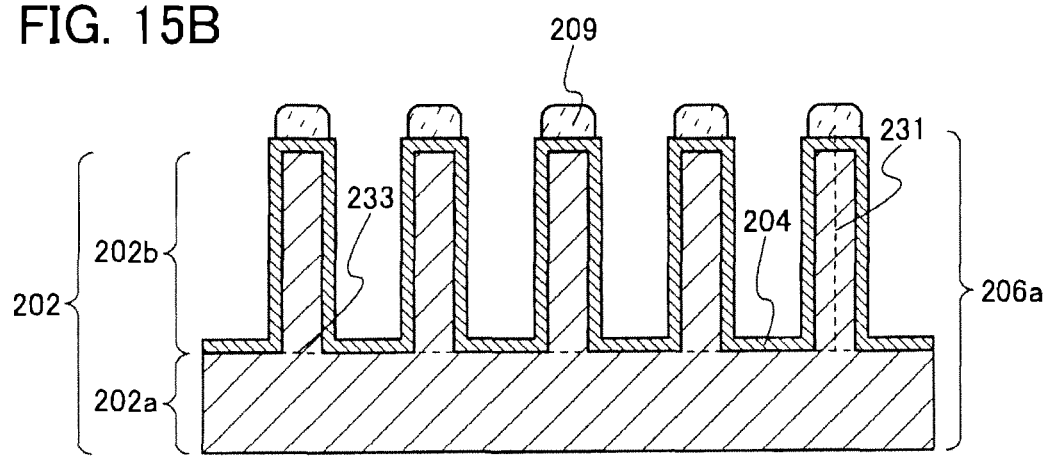

FIG. 15B is an enlarged cross-sectional view of the negative electrode 206a and the spacer 209. The negative electrode 206a includes an active material 202 and a graphene 204 provided over the active material 202. The active material 202 includes a common portion 202a and a plurality of protrusions 202b which protrude from the common portion 202a. The spacer 209 is provided over the graphene 204 of the negative electrode 206a.

The spacer 209 has an insulating property and is formed using a material which does not react with an electrolyte. Specifically, an organic material such as an acrylic resin, an epoxy resin, a silicone resin, polyimide, or polyamide, a low-melting-point glass material such as glass paste, glass frit, or glass ribbon, or the like can be used. Note that a solute of an electrolyte described later may be mixed into the material which has an insulating property and does not react with an electrolyte. As a result, the spacer 209 also functions as a solid electrolyte.

The thickness of the spacer 209 is preferably greater than or equal to 1 μm and less than or equal to 10 μm, more preferably greater than or equal to 2 μm and less than or equal to 7 μm. As a result, as compared to the case where a separator having a thickness of several tens of micrometers is provided between the positive electrode and the negative electrode as in a conventional power storage device, the distance between the positive electrode and the negative electrode can be reduced, and the distance of movement of carrier ions between the positive electrode and the negative electrode can be short. Accordingly, the positive electrode and the negative electrode can be prevented from being in contact with each other, and carrier ions included in the power storage device can be effectively used for charge/discharge.

Figure 16A:
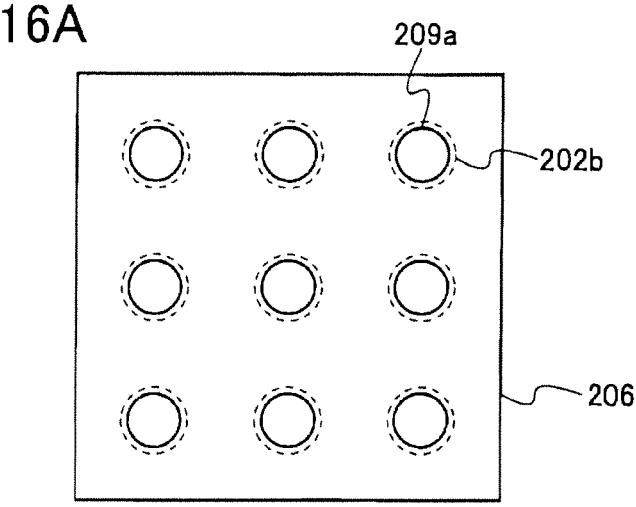
FIGS. 16A to 16C each illustrate a shape of a spacer.
Figure 16B:
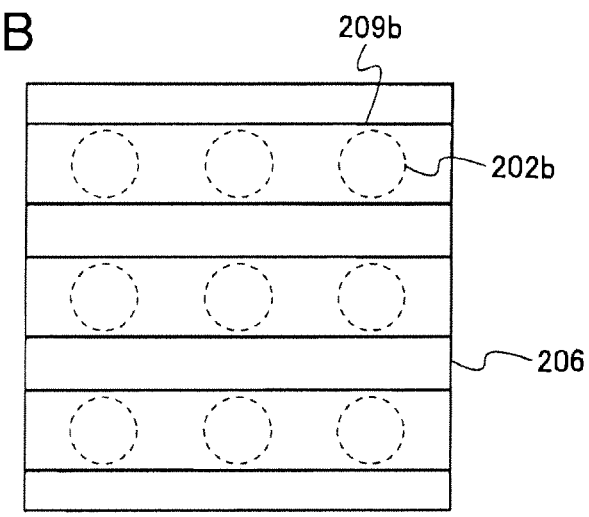
Figure 16C:
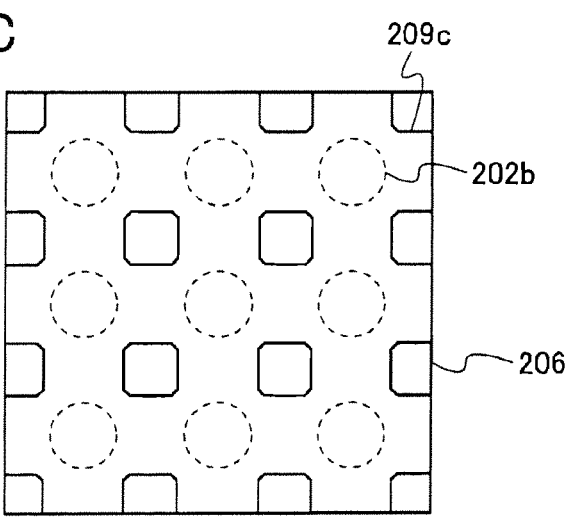

The shape of the spacer 209 is described with reference to FIGS. 16A to 16C. FIGS. 16A to 16C are top views of the negative electrode 206. Typical examples of the spacer 209 are a spacer 209a, a spacer 209b, and a spacer 209c in FIGS. 16A, 16B, and 16C, respectively. In FIGS. 16A to 16C, the plurality of protrusions 202b are denoted by dashed lines and the spacers 209a to 209c are denoted by solid lines.

FIG. 16A is a top view illustrating the negative electrode 206 in which one spacer 209a is provided over each protrusion 202b. Here, the shape of the spacer 209a is circular, but may also be polygonal as appropriate.

FIG. 16B is a top view illustrating the negative electrode 206 in which the rectangular spacer 209b is provided over the protrusions 202b. Here, one spacer 209b is provided so as to form a straight band over the plurality of protrusions 202b. Note that in this embodiment, the side surface of the spacer 209b is straight but may also be curved.

FIG. 16C is a top view illustrating the negative electrode 206 in which the lattice-like spacer 209c is provided over the protrusions 202b. Here, one spacer 209c is provided over the plurality of protrusions 202b.

The shape of the spacer 209 is not limited those in FIGS. 16A to 16C. It is sufficient as long as the spacer 209 has an opening in part of it and may have a closed circular or polygonal loop shape.

Since the spacer 209 is provided over the negative electrode 206, a separator is not needed in the power storage device completed later. Consequently, the number of components of the power storage device and the cost can be reduced.

Figure 15C:
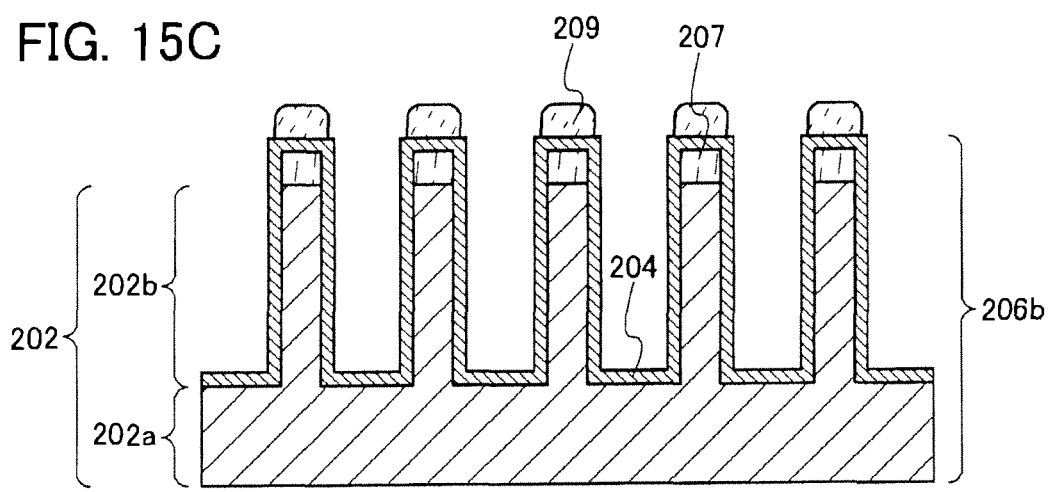

Like the negative electrode 206b illustrated in FIG. 15C, a protective layer 207 may be provided between the top of the protrusion 202b in the active material 202 and the graphene 204.

Next, a method for manufacturing the negative electrode 206 will be described with reference to FIGS. 17A to 17C. Here, as one mode of the negative electrode 206, the negative electrode 206a illustrated in FIG. 15B will be described.

Figure 17A:
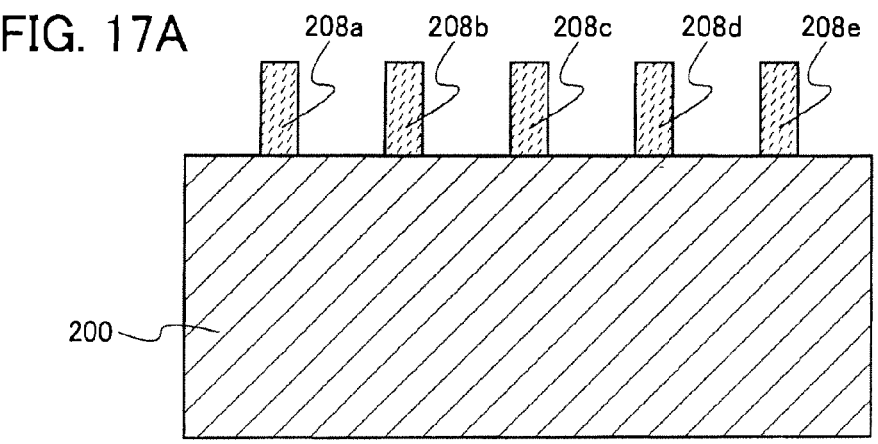
FIGS. 17A to 17C illustrate a method for manufacturing a negative electrode.

As illustrated in FIG. 17A, masks 208a to 208e are formed over a silicon substrate 200 as in Embodiment 1.

Figure 17B:
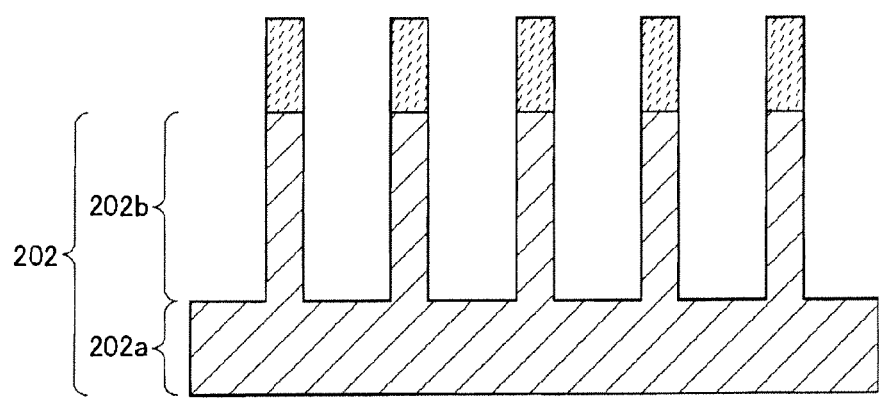

The silicon substrate 200 is selectively etched with the use of the masks 208a to 208e as in Embodiment 1, so that the active material 202 is formed as illustrated in FIG. 17B.

Figure 17C:
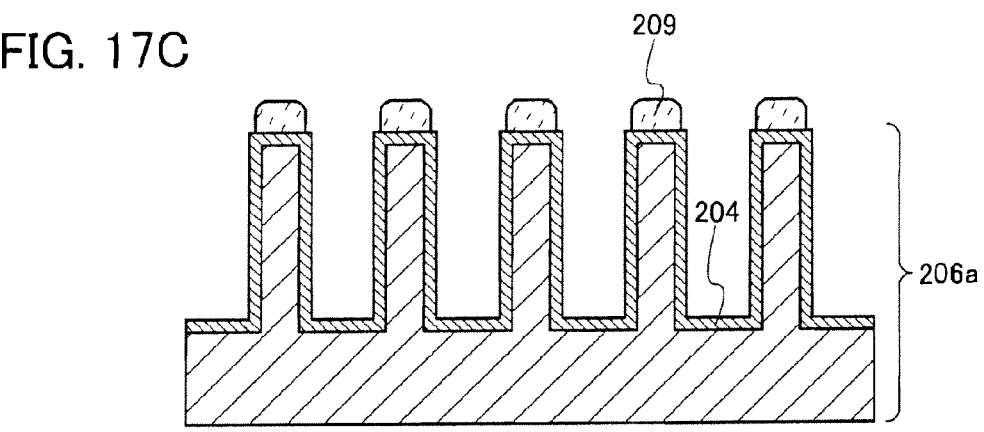

Next, after the masks 208a to 208e are removed, the graphene 204 is formed over the active material 202 as in Embodiment 1, so that the negative electrode 206a can be formed as illustrated in FIG. 17C.

Then, the spacer 209 is formed over the graphene 204 (see FIG. 17C). The spacer 209 can be formed in such a manner that a composition containing a material of the spacer 209 is selectively provided over the protrusions by a printing method, an inkjet method, or the like and heated so as to vaporize a solvent of the composition containing a material of the spacer 209. Alternatively, the spacer 209 can be formed in such a manner that only top portions of the protrusions are soaked in the composition containing a material of the spacer 209, and then heating is performed so as to vaporize a solvent of the composition containing a material of the spacer 209.

In accordance with this embodiment, the negative electrode 206a illustrated in FIG. 15B can be formed.

A protective layer is formed over the silicon substrate 200, the masks 208a to 208e are formed over the protective layer, and separated protective layers 207 are formed with the use of the masks 208a to 208e (see FIG. 15C). After that, with the use of the masks 208a to 208e and the separated protective layers, the silicon substrate 200 is selectively etched. After that, the graphene 204 and the spacer 209 are formed, whereby the negative electrode 206b in FIG. 15C can be formed. When the plurality of protrusions 202b are high, that is, the etching time is long, the masks are thinned gradually in the etching step and part of the masks are removed to expose the silicon substrate 200. Accordingly, there is variation in height between the protrusions. However, by using the separated protective layers 207 as hard masks, the silicon substrate 200 can be prevented from being exposed so that variation in height between the protrusions can be reduced.

Embodiment 6

In this embodiment, a negative electrode having a structure different from those of Embodiments 1 to 5 and a method for manufacturing the negative electrode will be described with reference to FIGS. 18A to 18D and FIGS. 19A to 19C. The negative electrode described in this embodiment is different from that of Embodiment 5 in that a current collector is provided. In this embodiment, description is made using Embodiment 2; however, this embodiment can also be applied to Embodiment 4 as appropriate.

FIG. 18A is a cross-sectional view of a negative electrode 216. In the negative electrode 216, an active material layer 215 is provided over a current collector 211. An insulating layer functioning as a spacer (hereinafter referred to as a spacer 219) is provided over the negative electrode 216.

A specific structure of the negative electrode 216 will be described with reference to FIGS. 18B to 18C. Typical examples of the active material layer 215 included in the negative electrode 216 are an active material layer 215a, an active material layer 215b, and an active material layer 215c in FIGS. 18B, 18C, and 18D, respectively.

FIG. 18B is an enlarged cross-sectional view of the current collector 211, the active material layer 215a, and the spacer 219. The active material layer 215a is provided over the current collector 211. The spacer 219 is provided over a graphene 214 of the active material layer 215a.

The spacer 219 can be formed using a material similar to that of the spacer 209 in Embodiment 5.

Like the active material layer 215b in FIG. 18C, the negative electrode 216 may have a structure in which the common portion is not provided, the plurality of protrusions 212b which are separated from each other are provided over the current collector 211, and the graphene 214 is formed over the current collector 211 and the plurality of protrusions 212b.

The graphene 214 is in contact with part of the current collector 211, so that electrons can flow easily in the graphene 214 and reaction between the carrier ions and the active material can be improved.

Like the active material layer 215c illustrated in FIG. 18D, a protective layer 217 may be provided between the top of the protrusion 212b and the graphene 214.

A method for forming the negative electrode 216 will be described with reference to FIGS. 19A to 19C. Here, as one mode of the active material layer 215, the active material layer 215a illustrated in FIG. 18B will be described.

Figure 19A:
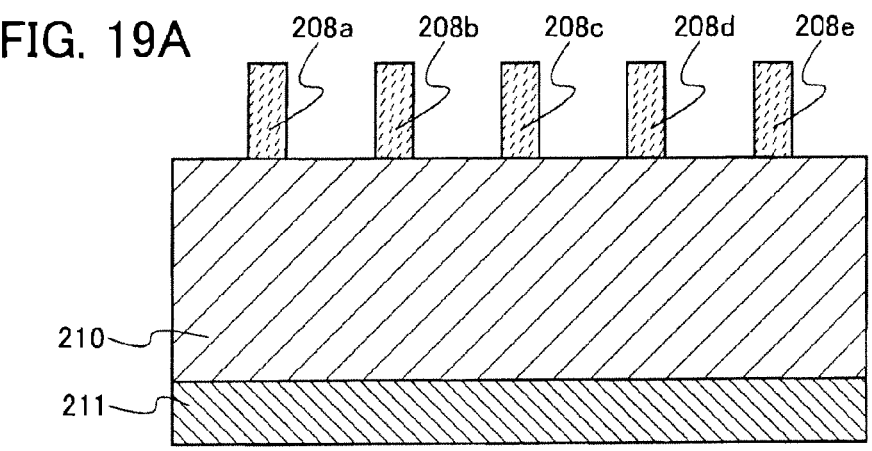
FIGS. 19A to 19C illustrate a method for manufacturing a negative electrode.

As illustrated in FIG. 19A, a silicon layer 210 is formed over the current collector 211 as in Embodiment 2. Then, as in Embodiment 2, masks 208a to 208e are formed over the silicon layer 210.

Figure 19B:
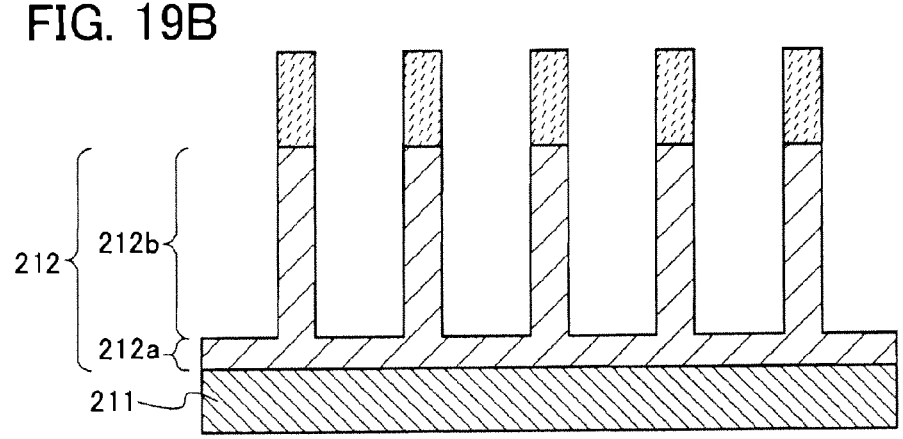

The silicon layer 210 is selectively etched with the use of the masks 208a to 208e as in Embodiment 1, so that the active material 212 is formed as illustrated in FIG. 19B.

Next, as in Embodiment 1, after the masks 208a to 208e are removed, the graphene 214 is formed over the active material 212.

The graphene 214 can be formed in a manner similar to that of the graphene 204 described in Embodiment 5.

Figure 19C:
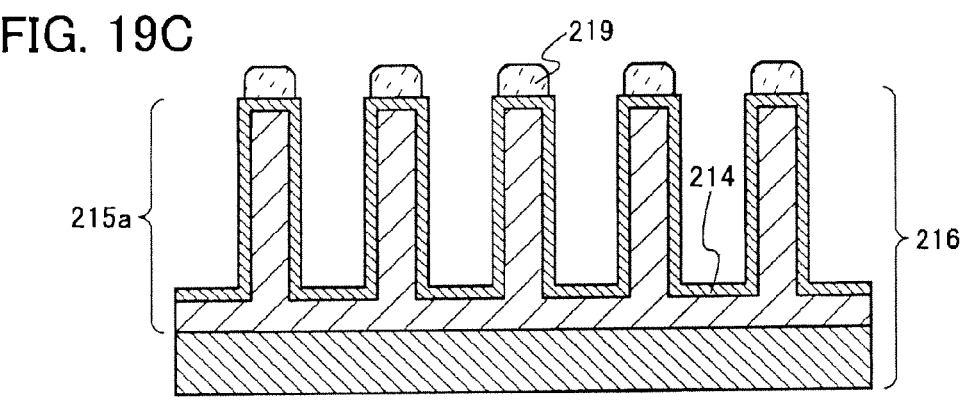

Then, the spacer 219 is formed over the graphene 214 (see FIG. 19C).

The spacer 219 can be formed in a manner similar to that of the spacer 209 in Embodiment 5.

Through the above steps, the negative electrode 216 in which the active material layer 215a is provided over the current collector 211 and the spacer 219 can be manufactured.

Note that in FIG. 19B, when the common portion 212a is etched to expose the current collector 211, the negative electrode including the active material layer 215b illustrated in FIG. 18C can be manufactured.

A protective layer is formed over the silicon layer 210, the masks 208a to 208e are formed over the protective layer, and separated protective layers 217 are formed with the use of the masks 208a to 208e (see FIG. 18C). After that, with the use of the masks 208a to 208e and the separated protective layers, the silicon layer 210 is selectively etched. After that, the graphene 214 and the spacer 219 are formed, whereby the negative electrode including the active material layer 215c as illustrated in FIG. 18D can be formed. When the plurality of protrusions 212b are high, that is, the etching time is long, the masks are thinned gradually in the etching step and part of the masks are removed to expose the silicon layer 210. Accordingly, there is variation in height between the protrusions. However, by using the separated protective layers 217 as hard masks, the silicon layer 210 can be prevented from being exposed so that variation in height between the protrusions can be reduced.

Embodiment 7

In this embodiment, a structure of a power storage device and a manufacturing method of the power storage device will be described.

First, a positive electrode and a manufacturing method thereof will be described.

Figure 20A:
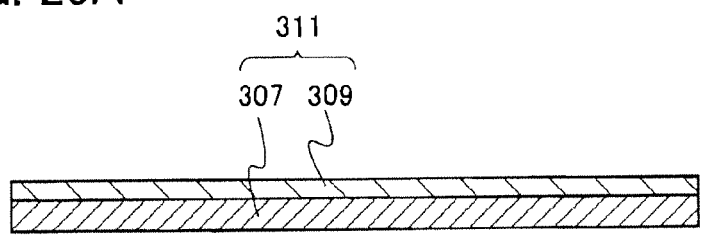
FIGS. 20A to 20C illustrate a positive electrode.

FIG. 20A is a cross-sectional view of a positive electrode 311. In the positive electrode 311, a positive electrode active material layer 309 is formed over a positive electrode current collector 307.

As the positive electrode current collector 307, a material having high conductivity such as platinum, aluminum, copper, titanium, or stainless steel can be used. The positive electrode current collector 307 can have a foil-like shape, a plate-like shape, a net-like shape, or the like as appropriate.

The positive electrode active material layer 309 can be formed using, as a material, a lithium compound such as $LiFeO_2$, $LiCoO_2$, $LiNiO_2$, or $LiMn_2O_4$, or $V_2O_5$, $Cr_2O_5$, $MnO_2$, or the like.

Alternatively, an olivine-type lithium-containing composite oxide (a general formula $LiMPO_4$ (M is one or more of Fe, Mn, Co, and Ni)) can be used. Typical examples of the general formula $LiMPO_4$ which can be used as a material are lithium compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hMn_iPO_4$ (f+g+h+i≤1, 0<f<1, 0<g<1, 0<h<1, and 0<i<1).

Alternatively, a lithium-containing composite oxide such as a general formula $Li_2MSiO_4$ (M is one or more of Fe, Mn, Co, and Ni) may be used. Typical examples of the general formula $Li_2MSiO_4$ which can be used as a material are lithium compounds such as $Li_2FeSiO_4$, $Li_2NiSiO_4$, $Li_2CoSiO_4$, $Li_2MnSiO_4$, $Li_2Fe_kNi_lSiO_4$, $Li_2Fe_kCo_lSiO_4$, $Li_2Fe_kMn_lSiO_4$, $Li_2Ni_kCo_lSiO_4$, $Li_2Ni_kMn_lSiO_4$ (k+l≤1, 0<k<1, and 0<l<1), $Li_2Fe_mNi_nCo_qSiO_4$, $Li_2Fe_mNi_nMn_qSiO_4$, $Li_2Ni_mCo_nMn_qSiO_4$ (m+n+q≤1, 0<m<1, 0<n<1, and 0<q<1), and $Li_2Fe_rNi_sCo_tMn_uSiO_4$ (r+s+t+u≤1, 0<r<1, 0<s<1, 0<t<1, and 0<u<1).

In the case where carrier ions are alkali metal ions other than lithium ions, alkaline-earth metal ions, beryllium ions, or magnesium ions, the positive electrode active material layer 309 may contain, instead of lithium in the lithium compound and the lithium-containing composite oxide, an alkali metal (e.g., sodium or potassium), an alkaline-earth metal (e.g., calcium, strontium, or barium), beryllium, or magnesium.

Figure 20B:
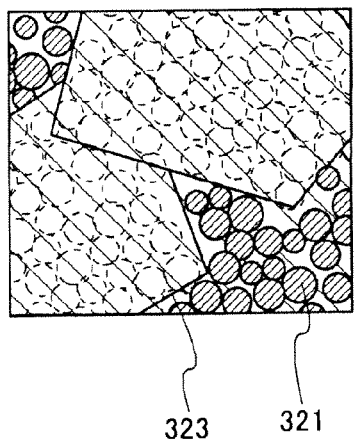

FIG. 20B is a plan view of the positive electrode active material layer 309. The positive electrode active material layer 309 contains positive electrode active materials 321 which are particles capable of occluding and releasing carrier ions, and graphenes 323 which cover a plurality of particles of the positive electrode active materials 321 and at least partly surround the plurality of particles of the positive electrode active materials 321. The plurality of graphenes 323 cover surfaces of the plurality of particles of the positive electrode active materials 321. The positive electrode active materials 321 may partly be exposed. The graphene 204 described in Embodiment 1 can be used as the graphene 323 as appropriate.

The size of the particle of the positive electrode active material 321 is preferably greater than or equal to 20 nm and less than or equal to 100 nm. Note that the size of the particle of the positive electrode active material 321 is preferably smaller because electrons transfer in the positive electrode active materials 321.

In the case where the positive electrode active material layer 309 contains the graphenes 323, sufficient characteristics can be obtained even when surfaces of the positive electrode active materials 321 are not covered with a graphite layer; however, it is preferable to use both the graphene 323 and the positive electrode active material covered with a graphite layer because electrons transfer hopping between the positive electrode active materials and current flows.

Figure 20C:
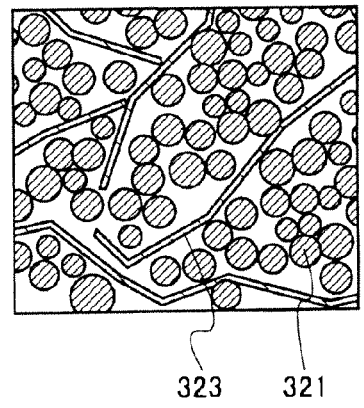

FIG. 20C is a cross-sectional view of part of the positive electrode active material layer 309 in FIG. 20B. The positive electrode active material layer 309 includes the positive electrode active materials 321 and the graphenes 323 which partly cover the positive electrode active materials 321. The graphenes 323 are observed to have linear shapes in cross section. A plurality of particles of the positive electrode active materials are at least partly surrounded with one graphene or plural graphenes. That is, the plurality of particles of the positive electrode active materials exist within one graphene or among plural graphenes. Note that the graphene has a bag-like shape, and the plurality particles of the positive electrode active materials are at least partly surrounded with the bag-like portion in some cases. In addition, the positive electrode active materials are not covered with the graphenes and partly exposed in some cases.

The desired thickness of the positive electrode active material layer 309 is determined in the range of greater than or equal to 20 μm and less than or equal to 100 μm. It is preferable to adjust the thickness of the positive electrode active material layer 309 as appropriate so that a crack and separation are not caused.

Note that the positive electrode active material layer 309 may contain acetylene black particles having a volume 0.1 times to 10 times as large as that of the graphene, carbon particles having a one-dimensional expansion (e.g., carbon nanofibers), or other known binders.

As an example of the positive electrode active material, a material whose volume is expanded by occlusion of ions serving as carriers is given. When such a material is used, the positive electrode active material layer gets vulnerable and is partly broken by charge/discharge, resulting in lower reliability of a power storage device. However, the graphene 323 covering the periphery of the positive electrode active materials allows prevention of dispersion of the positive electrode active materials and the breakdown of the positive electrode active material layer, even when the volume of the positive electrode active materials is increased and decreased due to charge/discharge. That is to say, the graphene has a function of maintaining the bond between the positive electrode active materials even when the volume of the positive electrode active materials is increased and decreased by charge/discharge.

The graphene 323 is in contact with a plurality of particles of the positive electrode active materials and also serves as a conductive additive. Further, the graphene 323 has a function of holding the positive electrode active materials 321 capable of occluding and releasing carrier ions. Thus, a binder does not have to be mixed into the positive electrode active material layer. Accordingly, the proportion of the positive electrode active materials in the positive electrode active material layer can be increased and the discharge capacity of a power storage device can be increased.

Next, a manufacturing method of the positive electrode active material layer 309 will be described.

Slurry containing particles of positive electrode active materials and graphene oxide is formed. After a positive electrode current collector is coated with the slurry, heating is performed in a reducing atmosphere for reduction treatment so that the positive electrode active materials are baked and part of oxygen is released from graphene oxide to form openings in graphene, as in the manufacturing method of graphene, which is described in Embodiment 1. Note that oxygen in the graphene oxide is not entirely reduced and partly remains in the graphene. Through the above process, the positive electrode active material layer 309 can be formed over the positive electrode current collector 307. Consequently, the positive electrode active material layer 309 has higher conductivity.

Graphene oxide contains oxygen and thus is negatively charged in a polar solvent. As a result of being negatively charged, graphene oxide is dispersed. Accordingly, the positive electrode active materials contained in the slurry are not easily aggregated, so that the size of the particle of the positive electrode active material can be prevented from increasing by baking. Thus, the transfer of electrons in the positive electrode active materials is facilitated, resulting in an increase in conductivity of the positive electrode active material layer.

Figure 21A:
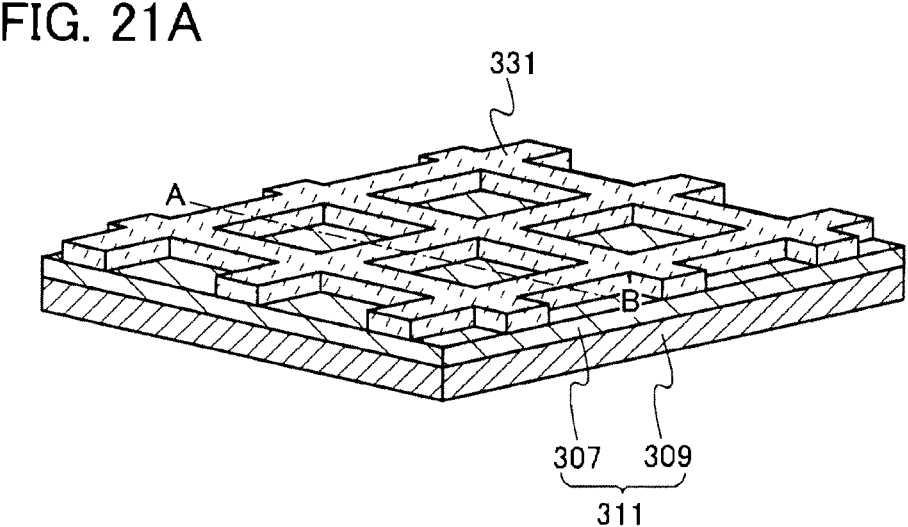
FIGS. 21A and 21B illustrate a positive electrode.
Figure 21B:
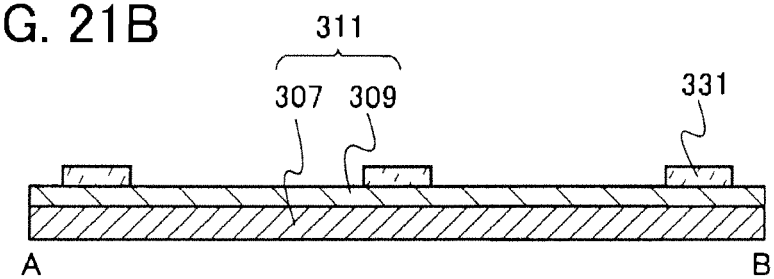

As illustrated in FIGS. 21A and 21B, a spacer 331 may be provided over a surface of the positive electrode 311. FIG. 21A is a perspective view of the positive electrode including the spacer, and FIG. 21B is a cross-sectional view along dashed and dotted line A-B in FIG. 21A.

As illustrated in FIGS. 21A and 21B, in the positive electrode 311, the positive electrode active material layer 309 is provided over the positive electrode current collector 307. The spacer 331 is provided over the positive electrode active material layer 309.

The spacer 331 has an insulating property and can be formed using a material which does not react with an electrolyte. Specifically, an organic material such as an acrylic resin, an epoxy resin, a silicone resin, polyimide, or polyamide, low-melting-point glass such as glass paste, glass frit, or glass ribbon, or the like can be used. Since the spacer 331 is provided over the positive electrode 311, a separator is not needed in the power storage device completed later. Consequently, the number of components of the power storage device and the cost can be reduced.

The spacer 331 preferably has a planar shape which exposes part of the positive electrode active material layer 309, such as lattice-like shape or a closed circular or polygonal loop shape. As a result, contact between the positive electrode and the negative electrode can be prevented, and the transfer of carrier ions between the positive electrode and the negative electrode can be promoted.

The thickness of the spacer 331 is preferably greater than or equal to 1 µm and less than or equal to 5 µm, preferably greater than or equal to 2 µm and less than or equal to 3 µm. As a result, as compared to the case where a separator having a thickness of several tens of micrometers is provided between the positive electrode and the negative electrode as in a conventional power storage device, the distance between the positive electrode and the negative electrode can be reduced, and the distance of movement of carrier ions between the positive electrode and the negative electrode can be short. Accordingly, carrier ions included in the power storage device can be effectively used for charge/discharge.

The spacer 331 can be formed by a printing method, an ink jetting method, or the like as appropriate.

Next, a structure of a power storage device and a manufacturing method thereof will be described.

An embodiment of a lithium-ion secondary battery in this embodiment which is a typical example of power storage devices will be described with reference to FIG. 22. Here, description is made below on a cross-sectional structure of the lithium-ion secondary battery.

Figure 22:
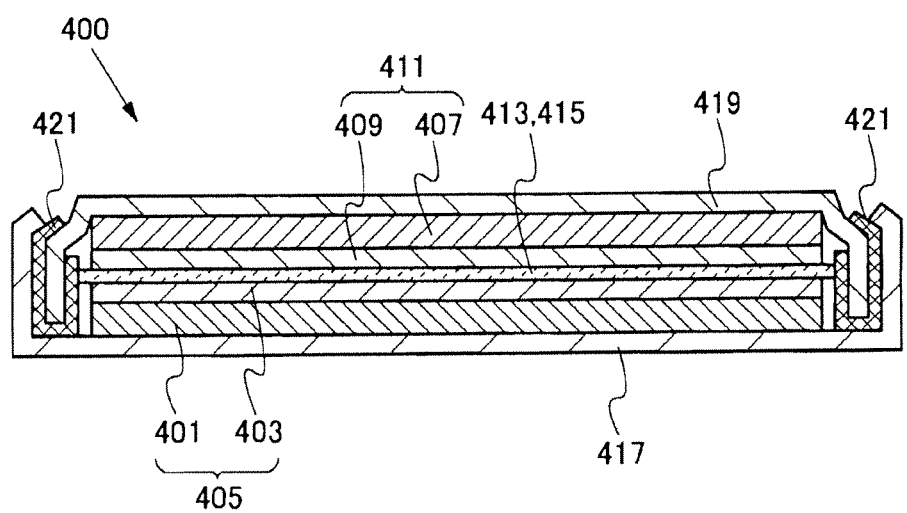
FIG. 22 illustrates a power storage device.

FIG. 22 is a cross-sectional view of the lithium-ion secondary battery.

A lithium-ion secondary battery 400 includes a negative electrode 411 including a negative electrode current collector 407 and a negative electrode active material layer 409, a positive electrode 405 including a positive electrode current collector 401 and a positive electrode active material layer 403, and a separator 413 provided between the negative electrode 411 and the positive electrode 405. Note that the separator 413 includes an electrolyte 415. The negative electrode current collector 407 is connected to an external terminal 419 and the positive electrode current collector 401 is connected to an external terminal 417. An end portion of the external terminal 419 is embedded in a gasket 421. In other words, the external terminals 417 and 419 are insulated from each other with the gasket 421.

The negative electrode 206 described in Embodiment 1, the negative electrode 216 described in Embodiment 2, the negative electrode 266 described in Embodiment 3, or the negative electrode 276 described in Embodiment 4 can be used as appropriate as the negative electrode 411.

As the positive electrode current collector 401 and the positive electrode active material layer 403, the positive electrode current collector 307 and the positive electrode active material layer 309 which are described in this embodiment can be used as appropriate.

An insulating porous material is used for the separator 413. Typical examples of the separator 413 include cellulose (paper), polyethylene, and polypropylene.

When a positive electrode including a spacer over a positive electrode active material layer as illustrated in FIGS. 21A and 21B is used as the positive electrode 405, the separator 413 is not necessarily provided.

As a solute of the electrolyte 415, a material including carrier ions is used. Typical examples of the solute of the electrolyte include lithium salt such as $LiClO_4$, $LiAsF_6$, $LiBF_4$, $LiPF_6$, and $Li(C_2F_5SO_2)_2N$.

Note that when carrier ions are alkali metal ions other than lithium ions, alkaline-earth metal ions, beryllium ions, or magnesium ions, instead of lithium in the above lithium salts, an alkali metal (e.g., sodium or potassium), an alkaline-earth metal (e.g., calcium, strontium, or barium), beryllium, or magnesium may be used for a solute of the electrolyte 415.

As a solvent of the electrolyte 415, a material in which carrier ions can transfer is used. As the solvent of the electrolyte 415, an aprotic organic solvent is preferably used. Typical examples of an aprotic organic solvent include ethylene carbonate, propylene carbonate, dimethyl carbonate, diethyl carbonate, γ-butyrolactone, acetonitrile, dimethoxyethane, tetrahydrofuran, and the like, and one or more of these materials can be used. When a gelled polymer material is used as the solvent of the electrolyte 415, safety against liquid leakage or the like is increased. Further, the lithium-ion secondary battery 400 can be thinner and more lightweight. Typical examples of a gelled polymer material include a silicon gel, an acrylic gel, an acrylonitrile gel, polyethylene oxide, polypropylene oxide, a fluorine-based polymer, and the like. In addition, by using one or plural kinds of ionic liquid (room-temperature molten salt) which has features of non-flammability and non-volatility as a solvent of the electrolyte 415, short-circuit inside the power storage device can be prevented, and moreover, even when the internal temperature is increased due to overcharge or the like, explosion, ignition, or the like of the power storage device can be prevented.

As the electrolyte 415, a solid electrolyte such as $Li_3PO_4$ can be used. Note that in the case of using the solid electrolyte as the electrolyte 415, the separator 413 is unnecessary.

For the external terminals 417 and 419, a metal member such as a stainless steel plate or an aluminum plate can be used as appropriate.

Note that in this embodiment, a coin-type lithium-ion secondary battery is given as the lithium-ion secondary battery 400; however, any of lithium-ion secondary batteries with various shapes, such as a sealing-type lithium-ion secondary battery, a cylindrical lithium-ion secondary battery, and a square-type lithium-ion secondary battery, can be used. Further, a structure in which a plurality of positive electrodes, a plurality of negative electrodes, and a plurality of separators are stacked or rolled may be employed.

Next, a method for manufacturing the lithium-ion secondary battery 400 described in this embodiment will be described.

By the manufacturing method described in Embodiment 1 and this embodiment, the positive electrode 405 and the negative electrode 411 are formed as appropriate.

Next, the positive electrode 405, the separator 413, and the negative electrode 411, are impregnated with the electrolyte 415. Then, the positive electrode 405, the separator 413, the gasket 421, the negative electrode 411, and the external terminal 419 are stacked in this order over the external terminal 417, and the external terminal 417 and the external terminal 419 are crimped to each other with a "coin cell crimper". Thus, the coin-type lithium ion secondary battery can be manufactured.

Note that a spacer and a washer may be provided between the external terminal 417 and the positive electrode 405 or between the external terminal 419 and the negative electrode 411 so that connection between the external terminal 417 and the positive electrode 405 or between the external terminal 419 and the negative electrode 411 is enhanced.

Embodiment 8

A power storage device according to an embodiment of the present invention can be used as a power supply of various electric devices which are driven by electric power.

Specific examples of electric devices using the power storage device according to an embodiment of the present invention are as follows: display devices, lighting devices, desktop personal computers or laptop personal computers, image reproduction devices which reproduce a still image or a moving image stored in a recording medium such as a digital versatile disc (DVD), mobile phones, portable game machines, portable information terminals, e-book readers, cameras such as video cameras and digital still cameras, high-frequency heating apparatuses such as microwaves, electric rice cookers, electric washing machines, air-conditioning systems such as air conditioners, electric refrigerators, electric freezers, electric refrigerator-freezers, freezers for preserving DNA, dialysis devices, and the like. In addition, moving objects driven by an electric motor using power from a power storage device are also included in the category of electric devices. As examples of the moving objects, electric vehicles, hybrid vehicles which include both an internal-combustion engine and an electric motor, motorized bicycles including motor-assisted bicycles, and the like can be given.

In the electric devices, the power storage device according to an embodiment of the present invention can be used as a power storage device for supplying power for almost the whole power consumption (such a power storage device is referred to as a main power supply). Alternatively, in the electric devices, the power storage device according to an embodiment of the present invention can be used as a power storage device which can supply power to the electric devices when the supply of power from the main power supply or a commercial power supply is stopped (such a power storage device is referred to as an uninterruptible power supply). Further alternatively, in the electric devices, the power storage device according to an embodiment of the present invention can be used as a power storage device for supplying power to the electric devices at the same time as the power supply from the main power supply or a commercial power supply (such a power storage device is referred to as an auxiliary power supply).

Figure 23:
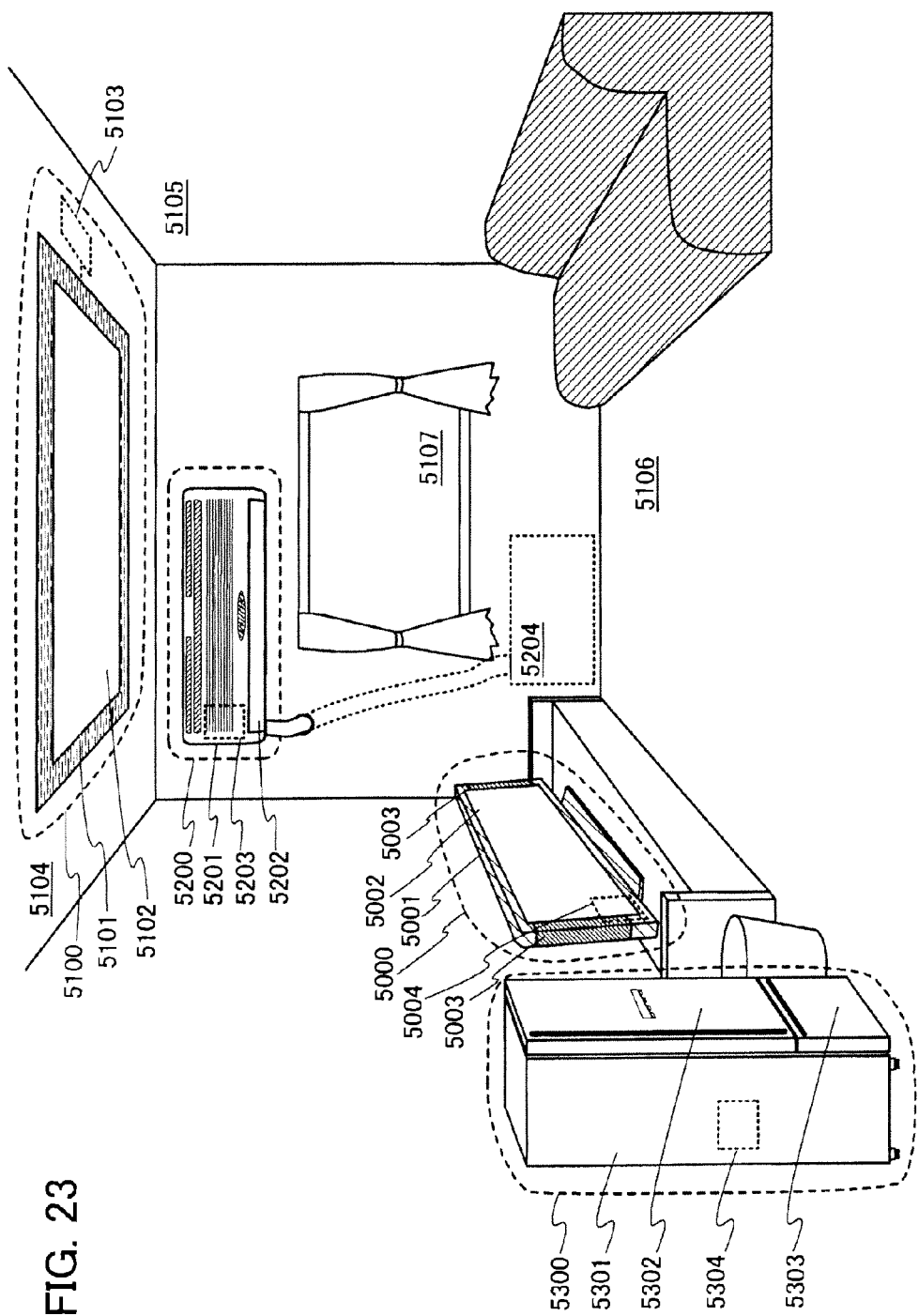
FIG. 23 illustrates electronic devices.

FIG. 23 illustrates specific structures of the electric devices. In FIG. 23, a display device 5000 is an example of an electric device including a power storage device 5004 according to an embodiment of the present invention. Specifically, the display device 5000 corresponds to a display device for TV broadcast reception and includes a housing 5001, a display portion 5002, speaker portions 5003, the power storage device 5004, and the like. The power storage device 5004 according to one embodiment of the present invention is provided inside the housing 5001. The display device 5000 can receive power from a commercial power supply. Alternatively, the display device 5000 can use power stored in the power storage device 5004. Thus, the display device 5000 can be operated with the use of the power storage device 5004 according to an embodiment of the present invention as an uninterruptible power supply even when power cannot be supplied from a commercial power supply due to power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), a field emission display (FED), and the like can be used for the display portion 5002.

Note that the display device includes, in its category, all of information display devices for personal computers, advertisement displays, and the like other than TV broadcast reception.

In FIG. 23, an installation lighting device 5100 is an example of an electric device including a power storage device 5103 according to an embodiment of the present invention. Specifically, the lighting device 5100 includes a housing 5101, a light source 5102, the power storage device 5103, and the like. FIG. 23 shows the case where the power storage device 5103 is provided in a ceiling 5104 on which the housing 5101 and the light source 5102 are installed; alternatively, the power storage device 5103 may be provided in the housing 5101. The lighting device 5100 can receive power from a commercial power supply. Alternatively, the lighting device 5100 can use power stored in the power storage device 5103. Thus, the lighting device 5100 can be operated with the use of the power storage device 5103 according to an embodiment of the present invention as an uninterruptible power supply even when power cannot be supplied from a commercial power supply because of power failure or the like.

Note that although the installation lighting device 5100 provided in the ceiling 5104 is shown in FIG. 23 as an example, the power storage device according to an embodiment of the present invention can be used in an installation lighting device provided in, for example, a wall 5105, a floor 5106, a window 5107, or the like other than the ceiling 5104. Alternatively, the power storage device can be used in a tabletop lighting device and the like.

As the light source 5102, an artificial light source which provides light artificially by using power can be used. Specifically, a discharge lamp such as an incandescent lamp or a fluorescent lamp, and a light-emitting element such as an LED or an organic EL element are given as examples of the artificial light source.

In FIG. 23, an air conditioner including an indoor unit 5200 and an outdoor unit 5204 is an example of an electric device including a power storage device 5203 according to an embodiment of the present invention. Specifically, the indoor unit 5200 includes a housing 5201, a ventilation duct 5202, the power storage device 5203, and the like. Although FIG. 23 illustrates the case where the power storage device 5203 is provided in the indoor unit 5200, the power storage device 5203 may be provided in the outdoor unit 5204. Further alternatively, the power storage devices 5203 may be provided in both the indoor unit 5200 and the outdoor unit 5204. The air conditioner can receive power from a commercial power supply. Alternatively, the air conditioner can use power stored in the power storage device 5203. Specifically, in the case where the power storage devices 5203 are provided in both the indoor unit 5200 and the outdoor unit 5204, the air conditioner can be operated with the use of the power storage devices 5203 according to an embodiment of the present invention as an uninterruptible power supply even when power cannot be supplied from a commercial power supply due to power failure or the like.

Note that although the separated air conditioner including the indoor unit and the outdoor unit is illustrated in FIG. 23 as an example, the power storage device according to an embodiment of the present invention can be used in an air conditioner in which the functions of an indoor unit and an outdoor unit are integrated in one housing.

In FIG. 23, an electric refrigerator-freezer 5300 is an example of an electric device including a power storage device 5304 according to an embodiment of the present invention. Specifically, the electric refrigerator-freezer 5300 includes a housing 5301, a door for a refrigerator 5302, a door for a freezer 5303, the power storage device 5304, and the like. The power storage device 5304 is provided in the housing 5301 in FIG. 23. The electric refrigerator-freezer 5300 can receive power from a commercial power supply or can use power stored in the power storage device 5304. Thus, the electric refrigerator-freezer 5300 can be operated with the use of the power storage device 5304 according to an embodiment of the present invention as an uninterruptible power supply even when power cannot be supplied from a commercial power supply because of power failure or the like.

Note that among the electric devices described above, a high-frequency heating apparatus such as a microwave and an electric device such as an electric rice cooker require high power in a short time. The tripping of a circuit breaker of a commercial power supply in use of electric devices can be prevented by using the power storage device according to an embodiment of the present invention as an auxiliary power supply for supplying power which cannot be supplied enough by a commercial power supply.

In addition, in a time period when electric devices are not used, specifically when the proportion of the amount of power which is actually used to the total amount of power which can be supplied by a commercial power supply (such a proportion is referred to as usage rate of power) is low, power can be stored in the power storage device, whereby the usage rate of power can be reduced in a time period when the electric devices are used. In the case of the electric refrigerator-freezer 5300, power can be stored in the power storage device 5304 at night time when the temperature is low and the door for a refrigerator 5302 and the door for a freezer 5303 are not opened and closed. The power storage device 5304 is used as an auxiliary power supply in daytime when the temperature is high and the door for a refrigerator 5302 and the door for a freezer 5303 are opened and closed; thus, the usage rate of power in daytime can be reduced.

Next, a portable information terminal which is an example of electric devices will be described with reference to FIGS. 24A to 24C.

Figure 24A:
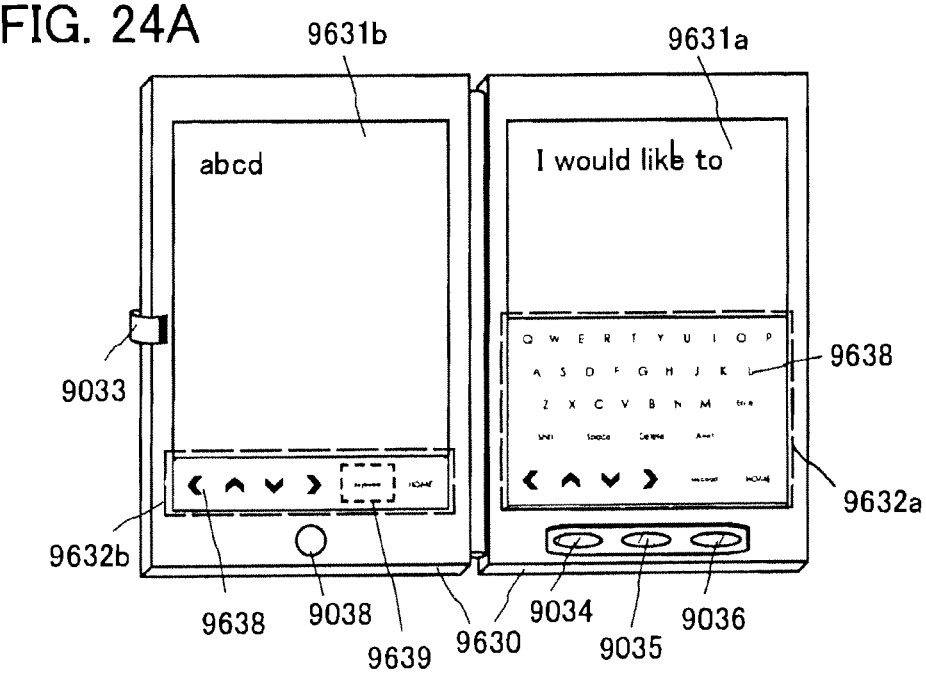
FIGS. 24A to 24C illustrate an electronic device.
Figure 24B:
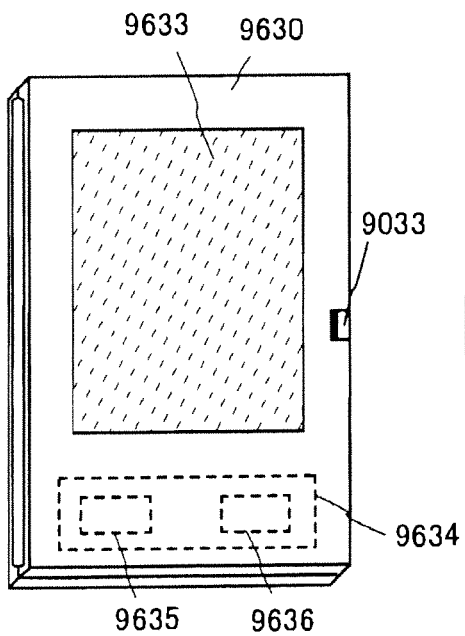

FIGS. 24A and 24B illustrate a tablet terminal that can be folded. In FIG. 24A, the tablet terminal is opened, and includes a housing 9630, a display portion 9631a, a display portion 9631b, a switch 9034 for switching display modes, a power switch 9035, a switch 9036 for switching to power-saving mode, a fastener 9033, and an operation switch 9038.

Part of the display portion 9631a can be a touch panel region 9632a and data can be input when a displayed operation key 9638 is touched. Although a structure in which a half region in the display portion 9631a has only a display function and the other half region has a touch panel function is shown as an example, the display portion 9631a is not limited to the structure. The whole region in the display portion 9631a may have a touch panel function. For example, the display portion 9631a can display keyboard buttons in the whole region to be a touch panel, and the display portion 9631b can be used as a display screen.

Similarly to the display portion 9631a, part of the display portion 9631b can be a touch panel region 9632b. A switching button 9639 for showing/hiding a keyboard of the touch panel is touched with a finger, a stylus, or the like, so that keyboard buttons can be displayed on the display portion 9631b.

Touch input can be performed in the touch panel region 9632a and the touch panel region 9632b at the same time.

The switch 9034 for switching display modes can switch the display between portrait mode, landscape mode, and the like, and between monochrome display and color display, for example. The switch 9036 for switching to power-saving mode can control display luminance to be optimal in accordance with the amount of external light in use of the tablet terminal which is detected by an optical sensor incorporated in the tablet terminal. Another detection device including a sensor for detecting inclination, such as a gyroscope or an acceleration sensor, may be incorporated in the tablet terminal, in addition to the optical sensor.

Note that FIG. 24A shows an example in which the display portion 9631a and the display portion 9631b have the same display area; however, without limitation thereon, one of the display portions may be different from the other display portion in size and display quality. For example, one display panel may be capable of higher-definition display than the other display panel.

The tablet terminal is closed in FIG. 24B. The tablet terminal includes the housing 9630, a solar cell 9633, a charge/discharge control circuit 9634, a battery 9635, and a DCDC converter 9636. In FIG. 24B, a structure including the battery 9635 and the DCDC converter 9636 is illustrated as an example of the charge/discharge control circuit 9634. The power storage device described in any of the above embodiments is used as the battery 9635.

Since the tablet terminal can be folded, the housing 9630 can be closed when the tablet terminal is not used. As a result, the display portion 9631a and the display portion 9631b can be protected; thus, a tablet terminal which has excellent durability and excellent reliability in terms of long-term use can be provided.

In addition, the tablet terminal illustrated in FIGS. 24A and 24B can have a function of displaying a variety of kinds of data (e.g., a still image, a moving image, and a text image), a function of displaying a calendar, a date, the time, or the like on the display portion, a touch-input function of operating or editing the data displayed on the display portion by touch input, a function of controlling processing by a variety of kinds of software (programs), and the like.

The solar cell 9633 provided on a surface of the tablet terminal can supply power to the touch panel, the display portion, a video signal processing portion, or the like. Note that a structure in which the solar cell 9633 is provided on one or two surfaces of the housing 9630 is preferable to charge the battery 9635 efficiently. When the power storage device described in any of the above embodiments is used as the battery 9635, there is an advantage of downsizing or the like.

The structure and the operation of the charge/discharge control circuit 9634 illustrated in FIG. 24B are described with reference to a block diagram in FIG. 24C. The solar cell 9633, the battery 9635, the DCDC converter 9636, a converter 9637, switches SW1 to SW3, and the display portion 9631 are shown in FIG. 24C, and the battery 9635, the DCDC converter 9636, the converter 9637, and the switches SW1 to SW3 correspond to the charge/discharge control circuit 9634 in FIG. 24B.

First, an example of the operation in the case where power is generated by the solar cell 9633 using external light is described. The voltage of power generated by the solar cell is raised or lowered by the DCDC converter 9636 so that the power has a voltage for charging the battery 9635. Then, when the power from the solar cell 9633 is used for the operation of the display portion 9631, the switch SW1 is turned on and the voltage of the power is raised or lowered by the converter 9637 so as to be a voltage needed for the display portion 9631. In addition, when display on the display portion

9631 is not performed, the switch SW1 is turned off and the switch SW2 is turned on so that charge of the battery 9635 may be performed.

Note that the solar cell 9633 is described as an example of a power generation means; however, without limitation thereon, the battery 9635 may be charged using another power generation means such as a piezoelectric element or a thermoelectric conversion element (Peltier element). For example, the battery 9635 may be charged with a non-contact power transmission module which is capable of charging by transmitting and receiving power by wireless (without contact), or another charging means may be used in combination.

Figure 24C:
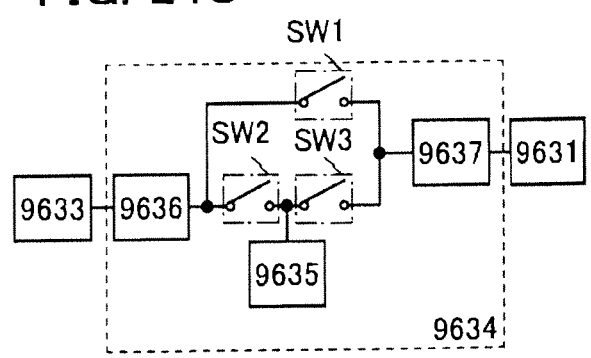

It is needless to say that an embodiment of the present invention is not limited to the electric device illustrated in FIGS. 24A to 24C as long as the power storage device described in any of the above embodiments is included.

This embodiment can be implemented by being combined as appropriate with any of the above-described embodiments.

EXPLANATION OF REFERENCE

200: silicon substrate, 202: active material, 202a: common portion, 202b: protrusion, 202c: protrusion, 204: graphene, 206: negative electrode, 206a: negative electrode, 206b: negative electrode, 207: protective layer, 208a: mask, 208e: mask, 209: spacer, 205: dashed line, 209a: spacer, 209b: spacer, 209c: spacer, 210: silicon layer, 211: current collector, 212: active material, 212a: common portion, 212b: protrusion, 214: graphene, 215: active material layer, 215a: active material layer, 215b: active material layer, 215c: active material layer, 216: negative electrode, 217: protective layer, 219: spacer, 221: cylindrical shape, 222: conical shape, 223: plate-like shape, 231: axis, 233: interface, 241: axis, 251: axis, 260: silicon substrate, 261: active material, 262: active material, 262a: common portion, 262b: protrusion, 262c: protrusion, 264: graphene, 266: negative electrode, 266a: negative electrode, 266b: negative electrode, 267: protective layer, 268a: mask, 268e: mask, 268f: mask, 268j: mask, 269: dashed line, 270: silicon layer, 271: current collector, 272: active material, 272a: common portion, 272b: protrusion, 274: graphene, 275: active material layer, 275a: active material layer, 275b: active material layer, 275c: active material layer, 276: negative electrode, 277: protective layer, 280: active material, 281: cylindrical shape, 282: conical shape, 283: plate-like shape, 307: positive electrode current collector, 309: positive electrode active material layer, 311: positive electrode, 321: positive electrode active material, 323: graphene, 331: spacer, 400: lithium-ion secondary battery, 401: positive electrode current collector, 403: positive electrode active material layer, 405: positive electrode, 407: negative electrode current collector, 409: negative electrode active material layer, 411: negative electrode, 413: separator, 415; electrolyte, 417: external terminal, 419: external terminal, 421: gasket, 5000: display device, 5001: housing, 5002: display portion, 5003: speaker portion, 5004: power storage device, 5100: lighting device, 5101: housing, 5102: light source, 5103: power storage device, 5104: ceiling, 5105: wall, 5106: floor, 5107: window, 5200: indoor unit, 5201: housing, 5202: ventilation duct, 5203: power storage device, 5204: outdoor unit, 5300: electric refrigerator-freezer, 5301: housing, 5302: door for refrigerator, 5303: door for freezer, 5304: power storage device, 9033: fastener, 9034: switch, 9035: power switch, 9036: switch, 9038: operation switch, 9630: housing, 9631: display portion, 9631a: display portion, 9631b: display portion, 9632a: region, 9632b: region, 9633: solar cell, 9634: charge/discharge control circuit, 9635: battery, 9636: DCDC converter, 9637: converter, 9638: operation key, 9639: button This application is based on Japanese Patent Application serial no. 2011-203579 filed with Japan Patent Office on Sep. 16, 2011, Japanese Patent Application serial no. 2011-207692 filed with Japan Patent Office on Sep. 22, 2011, and Japanese Patent Application serial no. 2011-217646 filed with Japan Patent Office on Sep. 30, 2011, the entire contents of which are hereby incorporated by reference.

The invention claimed is:

1. A power storage device comprising a negative electrode, the negative electrode comprising:
an active material layer comprising:
a common portion; and
a plurality of protrusions protruding from the common portion, and
a layer including a graphene over the common portion and the plurality of protrusions.

2. The power storage device according to claim 1, wherein axes of the plurality of protrusions are oriented in a same direction.

3. The power storage device according to claim 1, wherein in a lateral cross-sectional shape, an area of a bottom portion of each of the plurality of protrusions which is in contact with the common portion is larger than an area of a top portion of each of the plurality of protrusions.

4. The power storage device according to claim 1, wherein in a longitudinal cross-sectional shape, a width of a bottom portion of each of the plurality of protrusions which is in contact with the common portion is larger than a width of a top portion of each of the plurality of protrusions.

5. The power storage device according to claim 1, wherein the common portion or the plurality of protrusions comprise silicon.

6. The power storage device according to claim 1, wherein the plurality of protrusions each have a columnar shape, a conical or pyramidal shape, a plate-like shape, or a pipe-like shape.

7. The power storage device according to claim 1, further comprising a protective layer between a top portion of each of the plurality of protrusions and the graphene.

8. The power storage device according to claim 1, further comprising an insulating layer over the graphene of the negative electrode.

9. A power storage device comprising a negative electrode, the negative electrode comprising:
a current collector;
a plurality of protrusions over the current collector; and
a layer including a graphene over the current collector and the plurality of protrusions,
wherein each of the plurality of protrusions comprises an active material.

10. The power storage device according to claim 9, wherein axes of the plurality of protrusions are oriented in a same direction.

11. The power storage device according to claim 9, wherein in a lateral cross-sectional shape, an area of a bottom portion of each of the plurality of protrusions which is in contact with the current collector is larger than an area of a top portion of each of the plurality of protrusions.

12. The power storage device according to claim 9, wherein in a longitudinal cross-sectional shape, a width of a bottom portion of each of the plurality of protrusions which is in contact with the current collector is larger than a width of a top portion of each of the plurality of protrusions.

13. The power storage device according to claim 9, wherein the plurality of protrusions each have a columnar shape, a conical or pyramidal shape, a plate-like shape, or a pipe-like shape.

14. The power storage device according to claim 9, further comprising a protective layer between a top portion of each of the plurality of protrusions and the graphene.

15. The power storage device according to claim 9, further comprising an insulating layer over the graphene of the negative electrode.

16. The power storage device according to claim 1, further comprising a current collector in contact with the active material layer.

17. The power storage device according to claim 1, the plurality of protrusions are formed by etching.

18. The power storage device according to claim 9, the plurality of protrusions are formed by etching.

19. The power storage device according to claim 9, wherein the active material comprises silicon.

20. The power storage device according to claim 19, wherein the plurality of protrusions comprises phosphorus or boron as an impurity.

21. The power storage device according to claim 9, wherein the plurality of protrusions has translation symmetry.

22. The power storage device according to claim 1, wherein in a longitudinal cross-sectional shape, a width of a bottom portion of each of the plurality of protrusions which is in contact with the common portion is 0.1 to 1 µm.

23. The power storage device according to claim 20, further comprising a second protrusion over and in contact with each of the plurality of protrusions, and wherein the second protrusion has translation symmetry.

24. The power storage device according to claim 9, wherein the plurality of protrusions each have a prismatic or pyramidal shape, and wherein a top or an edge of each of the plurality of protrusions is curved.

* * * * *